(12) United States Patent
Chartier et al.

(10) Patent No.: US 12,447,934 B2
(45) Date of Patent: Oct. 21, 2025

(54) UNIVERSAL JOINT FOR A WHEEL CHOCK

(71) Applicant: 9172-9863 QUÉBEC INC., Terrebonne (CA)

(72) Inventors: Albert Chartier, Chertsey (CA); Catalin Dumitrascu, Laval (CA); Emanuel Lallemant, Saint-Colomban (CA); Gaetan Jette, Mascouche (CA)

(73) Assignee: 9172-9863 QUÉBEC INC., Terrebonne (CA)

( * ) Notice: Subject to any disclaimer, the term of this patent is extended or adjusted under 35 U.S.C. 154(b) by 469 days.

(21) Appl. No.: 18/006,187

(22) PCT Filed: Jul. 20, 2021

(86) PCT No.: PCT/CA2021/051000
§ 371 (c)(1),
(2) Date: Jan. 20, 2023

(87) PCT Pub. No.: WO2022/016265
PCT Pub. Date: Jan. 27, 2022

(65) Prior Publication Data
US 2023/0256945 A1 Aug. 17, 2023

Related U.S. Application Data

(60) Provisional application No. 63/054,013, filed on Jul. 20, 2020.

(51) Int. Cl.
*B60T 3/00* (2006.01)
*F16D 3/16* (2006.01)

(52) U.S. Cl.
CPC . *B60T 3/00* (2013.01); *F16D 3/16* (2013.01)

(58) Field of Classification Search
CPC .................................... B60T 3/00; F16D 3/16
See application file for complete search history.

(56) References Cited

U.S. PATENT DOCUMENTS 6,512,509 B1 * 1/2003 McVicar ................. F16D 3/382
345/161
7,032,720 B2 * 4/2006 Jette ..................... B65G 69/005
188/32

(Continued)

FOREIGN PATENT DOCUMENTS

WO  2016191882 A1  12/2016
WO  2020093178 A1  5/2020

*Primary Examiner* — Steven O Douglas
(74) *Attorney, Agent, or Firm* — Ziolkowski Patent Solutions Group, SC

(57) ABSTRACT

The universal joint (200) is provided at the free end (154) of the arm assembly (152) in a wheel chock handling unit (150) for securing a wheel chock (100). The joint (200) includes a main plate (220), a first pivot coupling (208) defining a yaw axis (210), and an elongated link (260) attached to the first pivot coupling (208) and being pivotable about the yaw axis (210). The joint (200) also includes means for limiting axial pivot movements of the link (260) within a range of angular positions having a first angular end position and a second angular end position. The joint (200) can be configured and arranged so that the wheel chock (100) can self-align using only its own weight, thus the force of gravity, along the entire range of positions along a base plate (110), or a portion thereof.

28 Claims, 17 Drawing Sheets

(56) References Cited

U.S. PATENT DOCUMENTS

| | | | | |
|---|---|---|---|---|
| 8,286,757 | B2* | 10/2012 | Nelson | B65G 69/005 188/4 R |
| 2006/0051196 | A1* | 3/2006 | McDonald | B65G 69/005 414/401 |
| 2009/0026022 | A1* | 1/2009 | Andersen | B60T 3/00 188/32 |
| 2012/0006632 | A1* | 1/2012 | Nelson | B65G 69/005 188/32 |

* cited by examiner

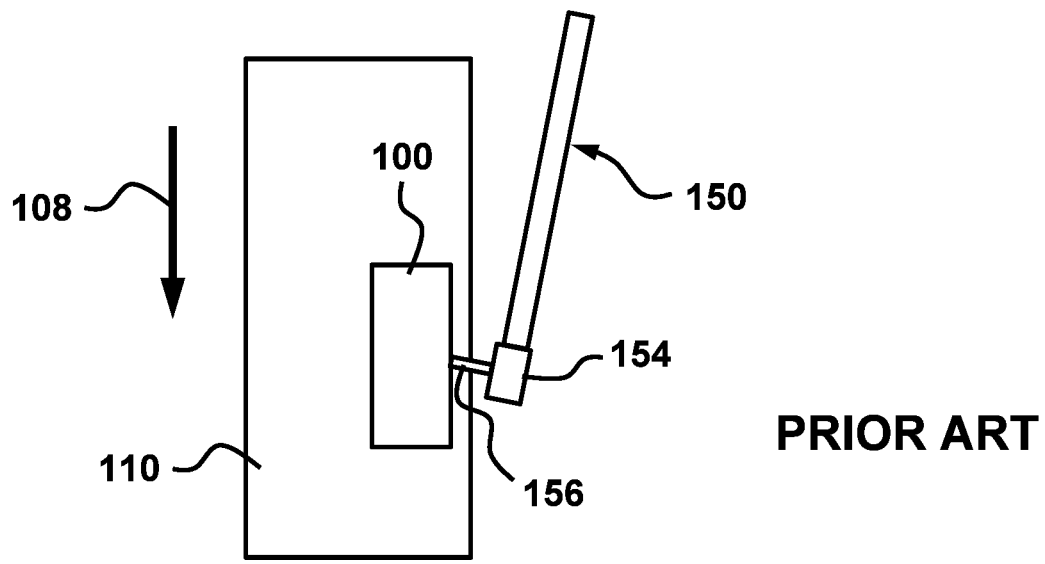
FIG. 6  PRIOR ART
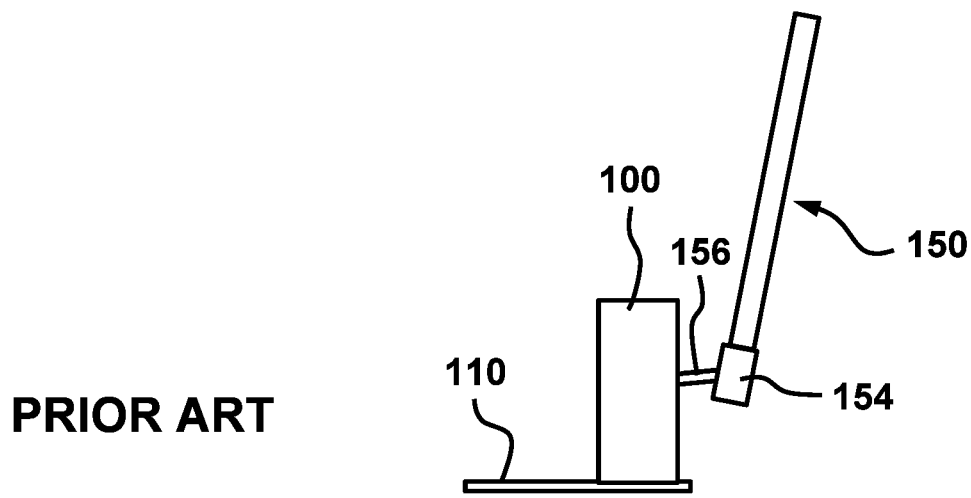
PRIOR ART  FIG. 7

UNIVERSAL JOINT FOR A WHEEL CHOCK

CROSS REFERENCE TO PRIOR APPLICATION

The present case claims the benefits of U.S. patent application No. 63/054,013 filed 20 Jul. 2020. The entire contents of this prior patent application are hereby incorporated by reference.

TECHNICAL FIELD

The technical field relates generally to the handling of wheel chocks capable of preventing vehicles from moving away in an unauthorized or accidental manner when they are parked, for instance at a loading area, at a loading dock, in a parking lot or area, or in any other suitable kinds of driveways or locations.

BACKGROUND

Wheel chocks are devices that can be positioned immediately next to a wheel of a parked vehicle so as to act as an obstacle in the event of an unauthorized or accidental departure. This event can happen as a result, for instance, of an error or because someone is trying to steal the vehicle. Many other situations exist, including ones where the vehicle movements are caused by other factors, such as trailer creep where motion of a lift truck entering and exiting a trailer can cause a separation between the trailer and the dock leveler. Other situations are possible as well.

Various wheel chock restraint systems have been suggested over the years. Examples can be found, for instance, in U.S. Pat. Nos. 10,793,119 and 10,864,895, as well as in U.S. patent application publication No. 2020/0216276 A1. The entire contents of these patent cases are hereby incorporated by reference. The underside of the wheel chocks can include, among other things, a plurality of teeth or other kinds of blocking elements engaging corresponding features provided on ground-anchored base plates on which the wheel chocks are set to create an obstacle in a departure direction. Other configurations and arrangements exist as well.

Various wheel chock handling units have also been suggested over the years for use with wheel chocks. These units can be part of wheel chock restraint systems. Examples can be found, for instance, in U.S. Pat. Nos. 7,032,720, 7,264,092 and 10,864,895, as well as in PCT patent application publication No. WO 2020/093178 A1. The entire contents of these patent cases are hereby incorporated by reference. A wheel chock handing unit can include, among other things, an articulated cantilever arm assembly having a proximal arm and a distal arm, as well as a spring-loaded mechanism that can counterbalance at least part of the weight of a wheel chock connected at the free end of the arm assembly, thereby helping a user in positioning the wheel chock on a base plate. The user may be, for instance, the driver of the vehicle or someone working at the site. A wheel chock handing unit can also be designed to bring back the wheel chock automatically towards a storage position when the wheel chock is removed from the base plate. Bringing a wheel chock back automatically when the vehicle is authorized to depart can be desirable. For instance, some users simply move the wheel chock on the side of the base plate because they are in a hurry or because they forgot to bring it back by hand all the way to the storage position where it will be out of the way of pedestrians and other vehicles.

While existing wheel chock handling units have been useful for the handling of wheel chocks, they required some compromises during their design and/or installation, and this often leads to a number of challenges. Some implementations, among other things, tend to orient the wheel chock out of alignment with reference to the longitudinal axis along which the base plate extends when the wheel chock is about to be set at some positions, for instance a position very close to the base of the arm assembly. This misalignment can generally be manually compensated by the user before bringing the wheel chock in a latched engagement with the base plate. However, it requires additional handling by the user, and the wheel chock may tend to return by itself to its original oblique orientation. Wheel chocks will generally remain firmly in position once they are in a latched engagement. However, in some implementations and under certain conditions, the forces generated by the spring-loaded mechanism of the wheel chock handling unit in combination with other factors, such as vibrations occurring when loading or unloading a vehicle, can cause a wheel chock set on a base plate at a short distance to tilt by itself over time. This is generally undesirable because it could potentially decrease the wheel chock efficiency in the event of an accidental or unauthorized departure. On the other hand, it can be difficult to mitigate this phenomenon using existing arrangements without potentially creating new issues at other positions. This can result in overcomplicated fine-tuning work and higher costs.

Overall, there is still room for further improvements in this area of technology.

SUMMARY

In one aspect, there is provided a universal joint as defined in claim 1.

In another aspect, there is provided a wheel chock restraint system as defined in claim 15.

In another aspect, there is provided a wheel chock handling unit as described, shown, and/or suggested herein.

In another aspect, there is provided a method of handling a wheel chock as described, shown, and/or suggested herein.

More details on the various aspects, features and advantages of the proposed concept can be found in the following detailed description and the appended figures.

BRIEF DESCRIPTION OF THE FIGURES

FIG. 6 is a semi-schematic top view depicting a wheel chock and the free end of the arm assembly when the wheel chock is at position B shown as an example in FIG. 5.

FIG. 7 is a semi-schematic front view of the arrangement illustrated in FIG. 6.

DETAILED DESCRIPTION

Figure 1:
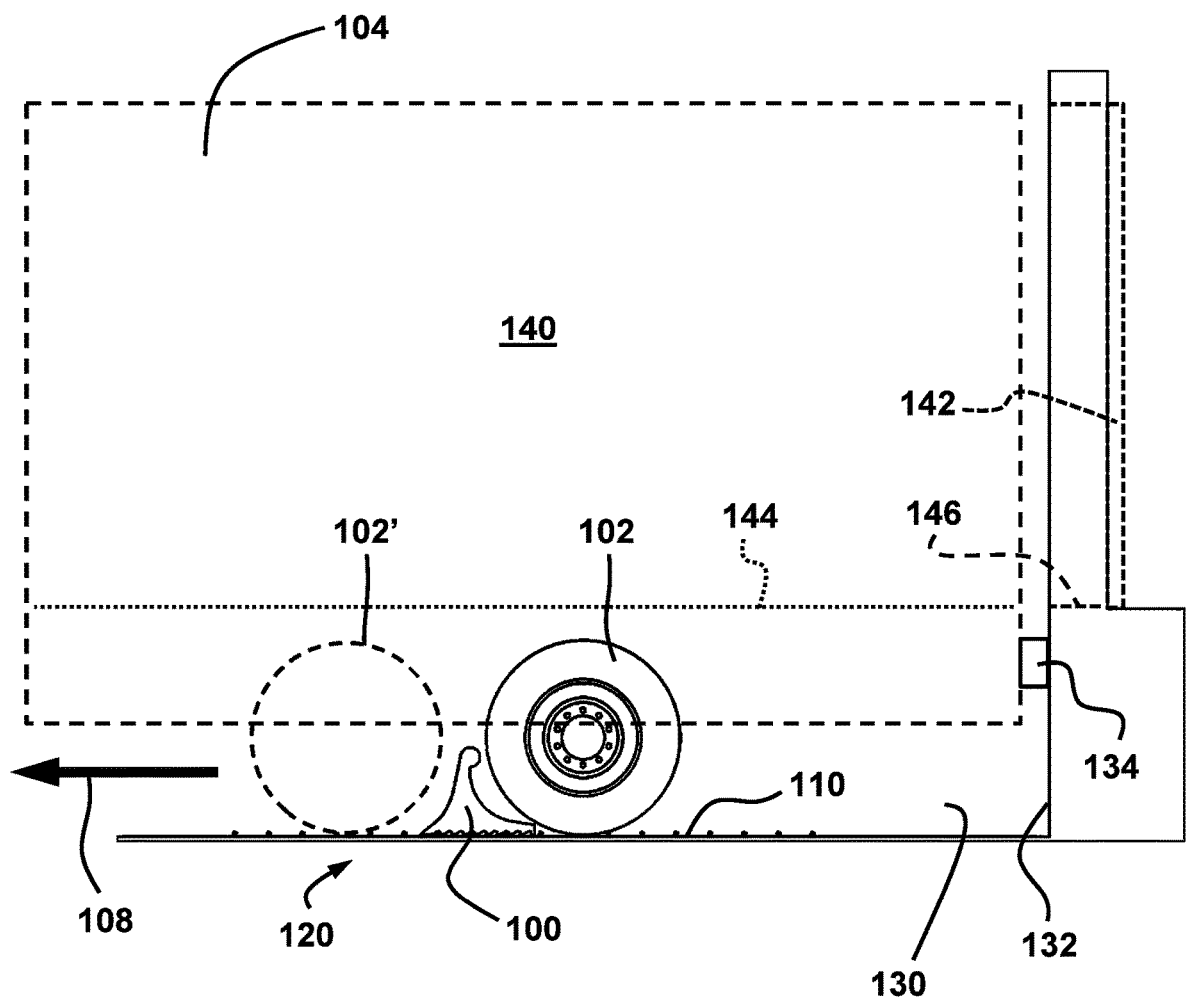
FIG. 1 is a semi-schematic side view illustrating an example of a wheel chock located in front of a wheel of a generic land vehicle.

FIG. 1 is a semi-schematic side view illustrating an example of a wheel chock 100 located in front of a wheel 102 of a generic land vehicle 104, for instance a truck trailer designed to be hauled by a truck tractor. This is only one among a multitude of possible uses for the wheel chock 100. In the example illustrated in FIG. 1, the wheel chock 100 is positioned between the wheel 102 and an adjacent wheel 102' located immediately in front of the wheel 102. The wheel 102 and the adjacent wheel 102' can be part of a tandem axle arrangement, as shown. Other configurations and arrangements are possible. Among other things, the wheel chock 100 can be used with vehicles that are not truck trailers, including vehicles unrelated to the transport industry. Other variants are possible as well.

The wheel chock 100 is provided for preventing the vehicle 104 from moving away in an unauthorized or accidental manner. This wheel chock 100 is designed to be positioned directly in front of the wheel 102 and over a ground-anchored base plate 110. The base plate 110 can be rigidly anchored to the ground, for instance using bolts or any other suitable arrangement. The wheel chock 100 and the base plate 110 are part of a wheel chock restraint system 120 in the illustrated example. The wheel chock 100 is in a tire-blocking position in FIG. 1 and prevents the vehicle 104 from moving in a direction of departure. This direction of departure corresponds to the longitudinal axis 108 in the illustrated example. The wheel chock 100 creates an obstacle to be removed only when the vehicle 104 is authorized to leave. The wheel chock 100 is otherwise left in position immediately in front of the wheel 102, thereby preventing the whole vehicle 104 from moving away.

The vehicle 104 in the example of FIG. 1 is shown as being parked at a loading dock 130 and its rear side is adjacent to a wall 132 located at a bottom end of the loading dock 130. The rear side or a rear bumper of the vehicle 104 can rest against one or more cushions 134 or the like, as shown schematically in FIG. 1. The wall 132 can be part of a commercial building, for instance a warehouse, a distribution center, or the like. Loading docks are not the only locations where wheel chocks can be useful. For instance, wheel chocks can be used at loading areas, in parking lots or areas, at truck stops, etc.

The vehicle 104 illustrated in FIG. 1 includes a cargo compartment 140. Access into the cargo compartment 140 can be made, for instance, using a rear door, which rear door is in registry with a corresponding garage door 142 when the vehicle 104 is parked at the end of the loading dock 130. The garage door 142 allows an opening provided through the wall 132 to be selectively closed and opened. The floor 144 inside the cargo compartment 140 and the floor 146 in front of the garage door 142 are shown being at the same height or at a similar height. A ramp or dock leveler (not shown) can otherwise be used between both floors 144, 146 if the height difference is too important for allowing a person or equipment, such as a lift truck or the like, to load and/or unload the cargo inside the cargo compartment 140 of the vehicle 104. Other configurations and arrangements are possible as well.

The base plate 110 can have an elongated and substantially rectangular shape, and it can extend linearly along the longitudinal axis 108. It can also include a plurality of blocking elements or stoppers 112 (see for instance FIG. 11) transversally disposed thereon and that are spaced apart from one another along the longitudinal axis 108, for instance regularly spaced individually or in pairs. The blocking elements 112 can be in the form of transversally disposed bars projecting above the surface of the rectangular plates, as shown in the illustrated example. The blocking elements 120 are configured and disposed to cooperate with corresponding teeth 114 (FIG. 12) provided underneath the wheel chock 100 so as to create a latching engagement between them when the wheel chock 100 is pushed forcefully in at least one direction. The base plate 110 can allow the wheel chock 100 to be placed at various distances from the wall 132 to accommodate vehicles of different sizes and wheel layouts, as shown. The base plate 110 can also include a peripheral rim 116 (FIG. 11) along at least a portion of one edge thereof. Other configurations and arrangements are possible. Among other things, the base plate 110 and/or its blocking elements 112 can be positioned and/or designed differently in some implementations. For instance, each blocking element 112 could be in the form of one or more spaced apart segments or teeth instead of extending uninterruptedly across the width of the base plate 110 as shown. The base plate 110 could be much shorter in length and even be provided in spaced-apart sections. The base plate 110 can include other kinds of rims or be provided without a peripheral rim. Some implementations could have only one possible position for the wheel chock 100. Still, a base plate 110 can be replaced by something else or even be omitted from the wheel chock restraint systems in some implementations. Other variants are possible as well.

It should be noted that the departure direction may not always be the forward direction of a vehicle in all instances since some wheel chocks may need to be positioned behind a wheel instead of being positioned in front of it. In some cases, the wheel chock can be bidirectional to prevent a vehicle from moving in two directions, namely forward and rearward. The wheel chock, whether it is bidirectional or not, can also be useful with a vehicle having a swap body configuration. Such vehicle has two basic parts, namely a chassis and a container that can be detached from the chassis. The container has supporting legs to keep it above the ground when detached from the chassis. The wheel chock can be set to prevent the complete vehicle, i.e., the chassis and the container, to leave. It can also be set to prevent the chassis of the vehicle from backing up, in a rearward travel direction, so as to be under the container. Hence, a wheel chock can be installed next to an object that is not necessarily a wheel when it is in a working position on a base plate. A wheel chock can also be in a working position on a base plate without being adjacent to a wheel or another object. Other variants are possible as well.

Figure 2:
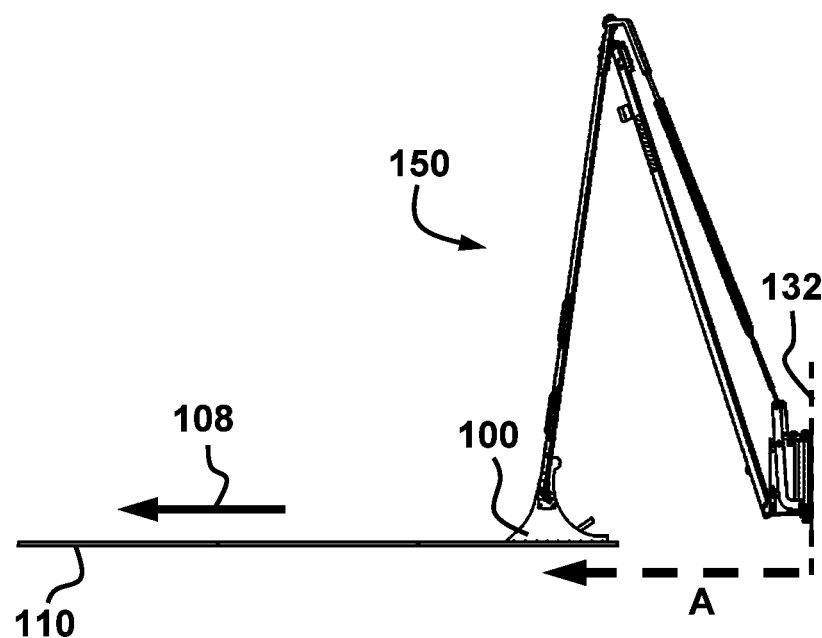
FIGS. 2 to 4 are semi-schematic side views illustrating an example of a generic wheel chock handling unit at different positions.
Figure 3:
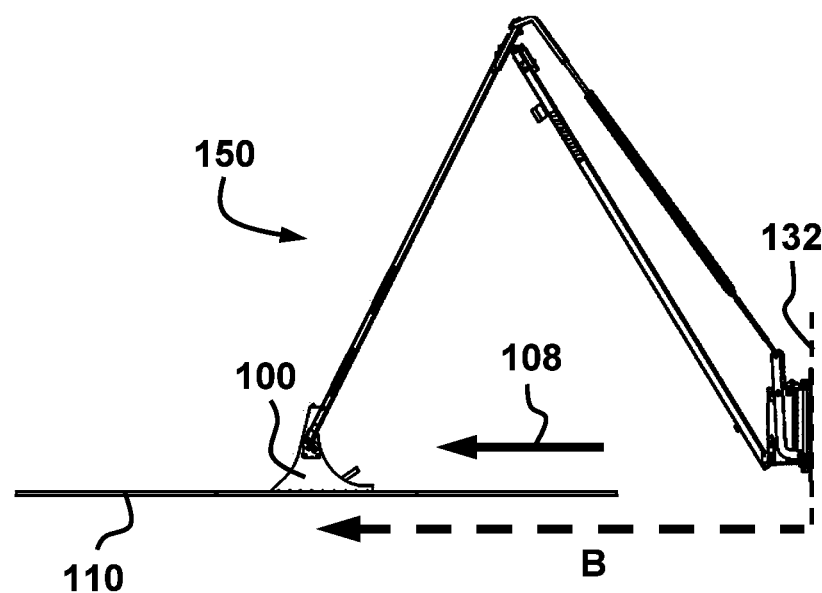
Figure 4:
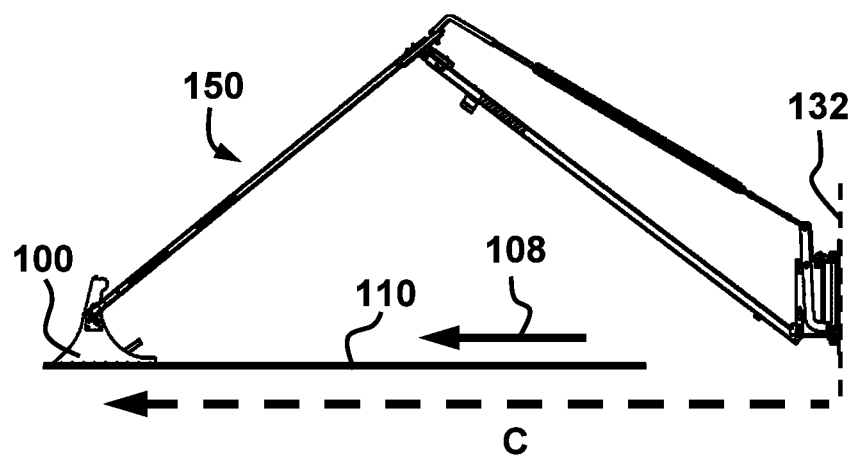

FIGS. 2 to 4 are semi-schematic side views illustrating an example of a generic wheel chock handling unit 150 at different positions. The wheel chock handling unit 150 is pivotally attached to a supporting structure, such as the vertical surface of the wall 132 provided at the end of the loading dock 130 (FIG. 1) or another kind of structure or object, just next to the location where a rear end of the vehicle 104 (FIG. 1) will be positioned when it is parked. The base of the wheel chock handling unit 150 is laterally offset from the base plate 110. The wheel chock handling unit 150 includes an articulated cantilever arm assembly 152 (FIG. 11) that is configured for angular displacement in a substantially vertical plane between a retracted storage position and a multitude of possible extended positions. Other configurations and arrangements are possible. Among other things, some wheel chock handling units can be designed differently. The wall 132 is only one example and it is possible to secure the wheel chock handling unit 150 to another kind of fixed location. For instance, one can use a stand anchored to the ground or attached elsewhere. Furthermore, the term "fixed location" includes any suitable supporting structure capable of holding the wheel chock handling unit 150 during operation. A fixed location can include, for instance, a large concrete block resting on the ground. Although such concrete block can generally be moved using an appropriate equipment or machinery, it still constitutes a fixed location in the context. The surface to which the base of the wheel chock handling unit 150 can be attached does not necessarily need to be vertical in all implementations. The following description mainly refers the wall 132 for the sake of simplicity. Hence, the term "wall" is only used herein in a generic and non-limitative way. Other variants are possible as well.

Figure 5:
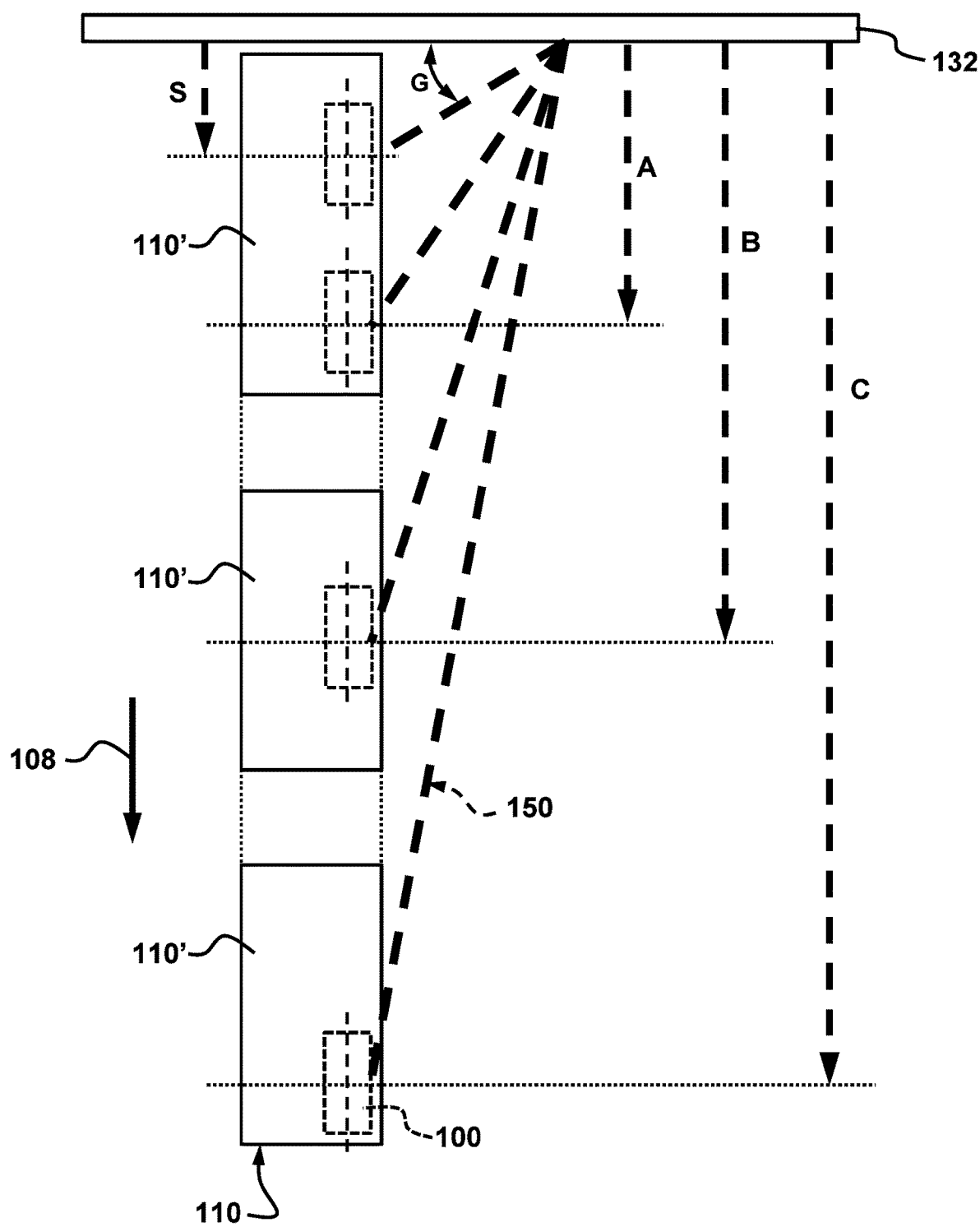
FIG. 5 is a schematic top view depicting the orientation of the arm assembly of the wheel chock handling unit at different positions, including those shown as examples in FIGS. 2 to 4.

Most wheel chock handling units 150 are designed so that the wheel chock 100 can be positioned at a wide range of positions. In FIG. 2, the wheel chock 100 is set over the corresponding base plate 110 at position A. FIGS. 3 and 4 show the wheel chock 100 being set at positions B and C, respectively. Position C can be, for instance, where the wheel chock 100 is the farthest away from the wall 132 because the arm assembly 152 of the illustrated wheel chock handling unit 150 is then fully extended. The longitudinal distance between the wheel chock 100 and the wall 132 thus increases when moving the wheel chock 100 from position A to position C. The arm assembly 152 that pivots about the vertical axis at its base will also be at a different angle G at each position. FIG. 5 shows that the orientation of the wheel chock handling unit 150, i.e., the angle G of the generally vertical plane in which the arm assembly 152 extends with reference to the longitudinal axis 108, is inversely proportional to the distance of the wheel chock 100 from the wall 132. Other configurations and arrangements are possible. Among other things, the different positions are only for the sake of explanation. Other variants are possible as well.

The wheel chock handling unit 150 often has only one position where the wheel chock 100 will be in an ideal natural alignment with the longitudinal axis 108 just before engaging the upper surface of the base plate 110. Such position is often an intermediary position with the range, for instance position B in the illustrated example. The wheel chock 100 can still be suitably orientated in other positions, for instance in positions A or C, due to the presence of a holding member 156 (see for instance FIG. 6) between the wheel chock 100 and the free end of the arm assembly 152 to compensate the variation of the orientation angle. The various hinges or articulations between the structural parts of the wheel chock handling unit 150 can also provide a certain degree of flexibility.

FIG. 5 is a schematic top view depicting the orientation of the arm assembly 152 of the wheel chock handling unit 150 at different positions, including those shown as examples in FIGS. 2 to 4. The wheel chock 100 is schematically represented on the base plate 110 at positions A, B, C, and S. Position S is an example of a position where the wheel chock 100 will be at or near its shortest distance from the wall 132. It is thus closer to the wall 132 than at position A. The distance from the wall 132 at position S can be for instance 30.5 cm to 38.1 cm (about 12 to 15 inches) in some implementations. The orientation angle is then greater, and the wheel chock 100 will often take a significant oblique orientation with reference the longitudinal axis 108. Other configurations and arrangements are possible. Among other things, the dimensions are only given for the sake of example. Other variants are possible as well.

It should be noted that in FIG. 5, the base plate 110 includes a plurality of separate base plate sections 110' that are spaced apart from another along the longitudinal axis 108 without having other base plate sections between them. The base plate 110 is shown in other figures as having juxtaposed base plate sections positioned end-to-end. The separate base plate sections 110' of FIG. 5 form together the base plate 110. Also, although the various figures show examples of a wheel chock restraint system 120 where the wheel chock handling unit 150 is located at the right of the base plate 110 when looking towards the wall 132, thus having a wheel chock 100 to be positioned next to a wheel or wheels 102, 102' located on the left side of the vehicle 104, the wheel chock handling unit 150 can be provided on the opposite side, i.e., where the wheel chock 100 can be positioned next to a wheel or wheels 102, 102' located on the right side of the vehicle 104. Many of the parts will then be a mirror image of what is shown and described herein. Other configurations and arrangements are possible. Among other things, one or more of the base plate sections 110' can be laterally offset from the others instead of being in registry with the longitudinal axis 108. In such context, the longitudinal axis 108 can be considered as the average line. Other variants are possible as well.

FIG. 6 is a semi-schematic top view depicting the wheel chock 100 and the free end 154 of the arm assembly 152 when the wheel chock 100 is at position B shown as an example in FIG. 5. FIG. 7 is a semi-schematic front view of the arrangement illustrated in FIG. 6. As can be seen, the conventional holding member 156 can be in the form of an elongated bar having a proximal end attached to the lateral side of the free end 154 of the arm assembly 152, and a distal end attached to a corresponding lateral side of the wheel chock 100, generally at or near the intersection of a transversal horizontal axis passing through the center of gravity of the wheel chock 100. The holding member 156 can include at least one ball joint at one end, allowing the wheel chock 100 some degree of freedom to be placed substantially parallel to the longitudinal axis 108 by a user at the various positions along the base plate 110. It should also be noted that the relative angles between the parts in FIGS. 6 and 7 are only for the sake of illustration.

Figure 8:
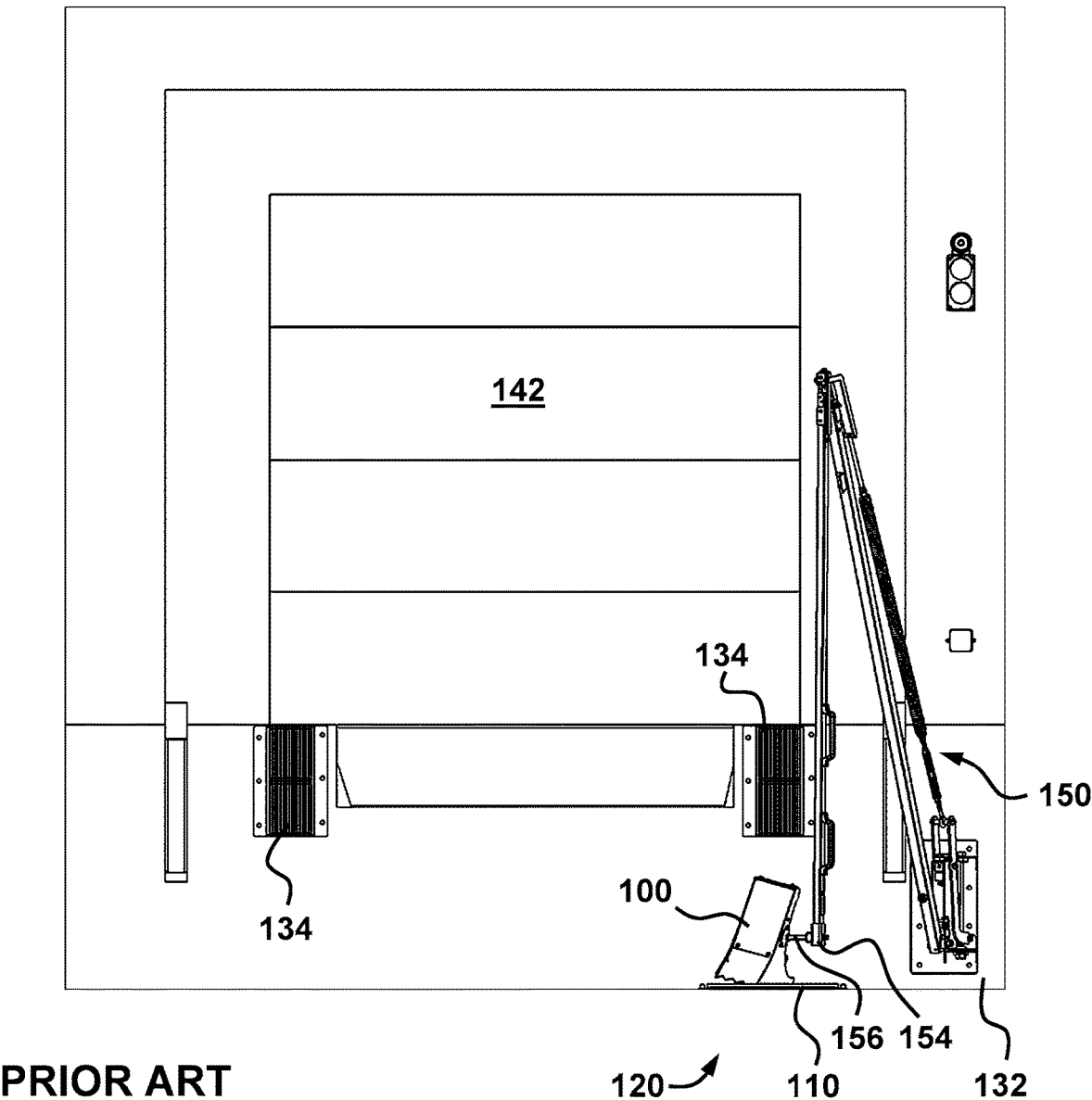
FIGS. 8 and 9 are views illustrating an example of what can occur when positioning the wheel chock at a very short distance from the wall using a wheel chock handling unit having a conventional holding member.
Figure 9:
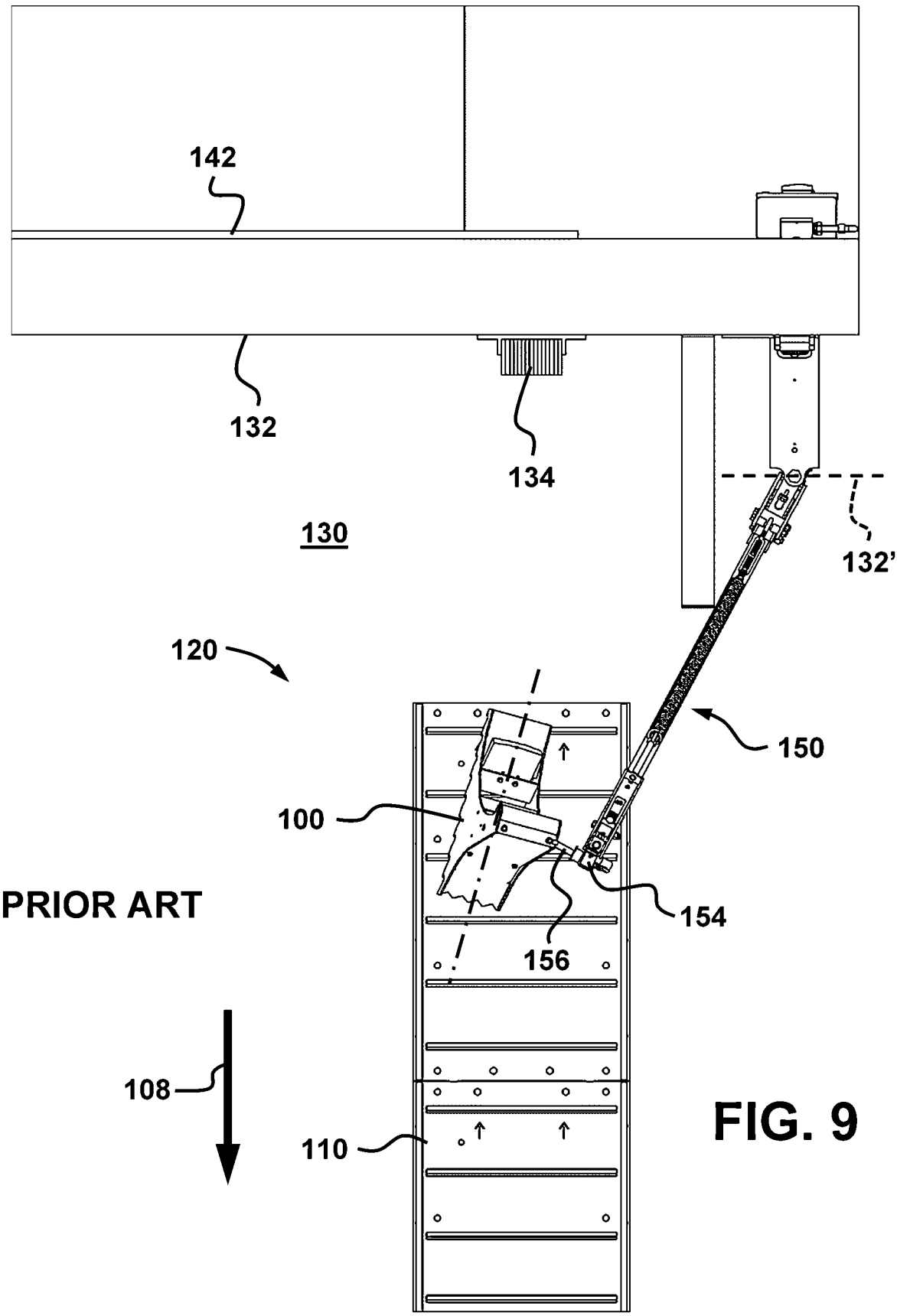

FIGS. 8 and 9 are views illustrating an example of what can occur when positioning the wheel chock 100 at a very short distance from the wall 132 using a wheel chock handling unit 150 having a conventional holding member 156. This very short distance can correspond, for instance, to position S shown as an example in FIG. 5. The arm assembly is then pivoted at a very wide angle with reference to the longitudinal axis 108 and the distal arm at the end of which the holding member 156 is attached is then tilted somewhat towards the rear. This causes the wheel chock 100 to naturally take an orientation where it is out of alignment with reference to the longitudinal axis 108. While this misalignment of the wheel chock 100 can generally be manually compensated by the user just before setting the wheel chock 100 in a latched engagement with the base plate 110 since position S is not beyond what can be physically achieved, the wheel chock 100 will tend to return to its natural oblique orientation with reference to the longitudinal axis 108.

It should be noted that the base of the wheel chock handling unit 150 can sometimes include a long bracket mount projecting from the wall 132, as shown in FIG. 9. The arm assembly of this wheel chock handling unit 150 thus pivots about a vertical pivot axis located relatively far from the surface of the wall 132. While it could be more accurate to compare the different positions, for instance positions A, B, C and S, from a reference plane 132' located at the vertical pivot axis and extending parallel to the wall 132, comparing the positions with reference to the wall 132 is also valid and the present text generally refers to the wall 132 for the sake of simplicity. In some of the subsequent figures, the reference plane 132' schematically represents the location of the supporting structure to which the base of the wheel chock handling unit 150 can be affixed. Other variants are possible as well.

FIGS. 10 to 23 illustrate an example of a universal joint 200 provided to replace a conventional holding member 156 and significantly improve the wheel chock handling unit 150, thus the wheel chock restraint system 120. This joint 200 can be designed and implemented in a variety of different ways. Among other things, it can be designed to facilitate the handling of the wheel chock 100 by prepositioning it correctly or almost correctly before putting it on the base plate 110, and to mitigate the tendency of a wheel chock 100 to move out of alignment by itself when installed on the base plate 110, particularly at a short distance from the wall 132. The joint 200 can be configured and arranged so that the wheel chock 100 can self-align using only its own weight, thus the force of gravity, along the entire range of positions along the base plate 110, or at least along a portion thereof. This way, the wheel chock 100 can automatically seek and maintain an orientation that is substantially parallel or at least closely parallel to the longitudinal axis 108 when it is suspended at the free end of the arm assembly 152.

Figure 10:
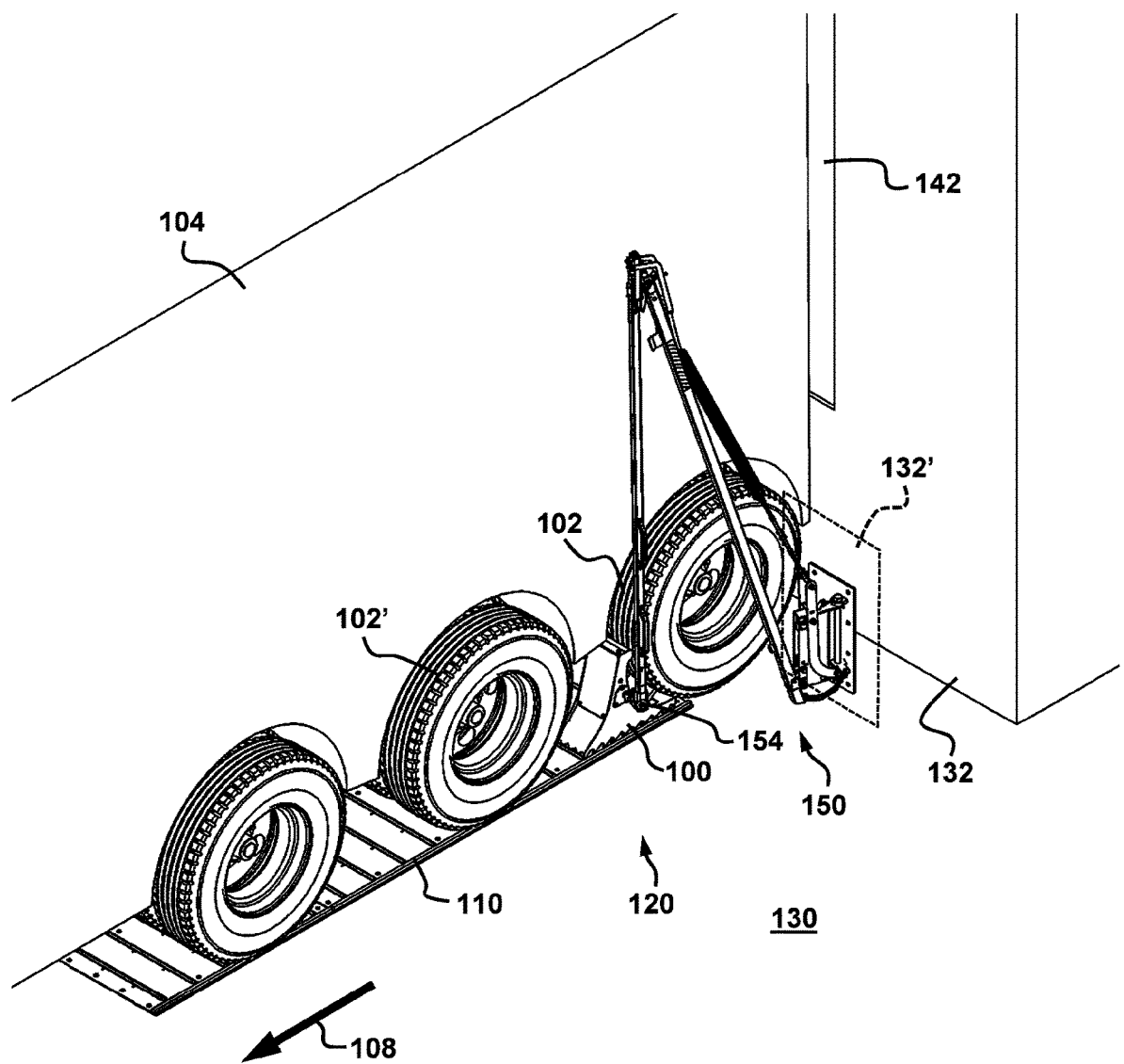
FIG. 10 is an isometric view illustrating an example of a wheel chock restraint system having a wheel chock handling unit as improved, and where the wheel chock is located in front of a wheel of a generic vehicle.
Figure 11:
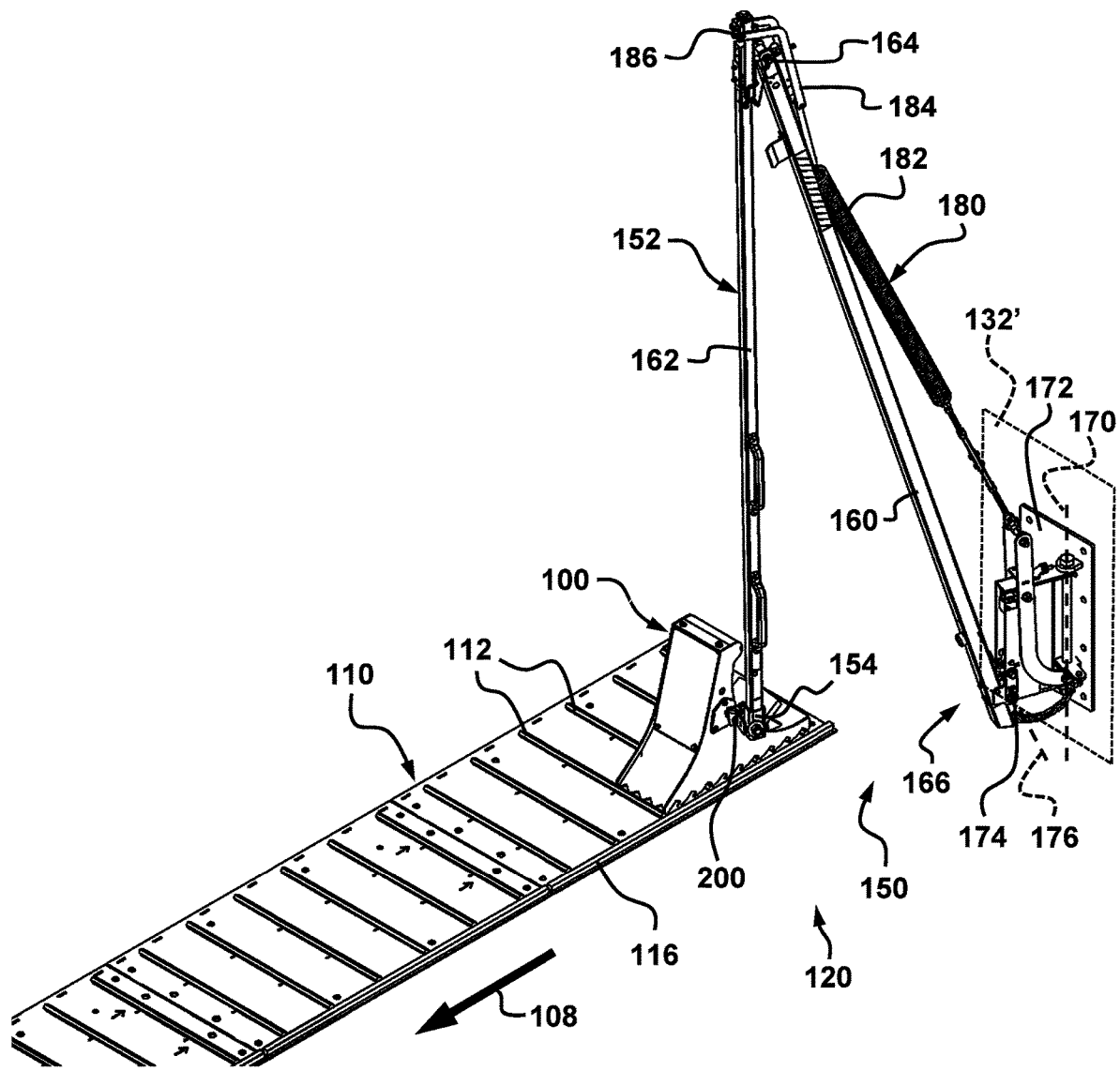
FIG. 11 illustrates only the wheel chock restraint system of FIG. 10.

FIG. 10 is an isometric view illustrating an example of a wheel chock restraint system 120 having a wheel chock handling unit 150 as improved, and where the wheel chock 100 is located in front of a wheel of a generic vehicle 104. The wheel chock 100 is then in a position where it is at a short distance from the wall 132. FIG. 11 illustrates only the wheel chock restraint system 120 of FIG. 10.

The illustrated arm assembly 152 includes a proximal arm 160 and a distal arm 162 in juxtaposition. The distal end of the proximal arm 160 can be pivotally attached to or near the proximal end of the distal arm 162 through a first upper hinge 164 or the like. As can be seen, the distal end of the distal arm 162 corresponds to the free end 154 of the arm assembly 152. The opposite end of the arm assembly 152, which corresponds to the proximal end of the proximal arm 160, can be operatively connected to a swivel base 166 that is affixed to a supporting structure 132'. The swivel base 166 is generally positioned slightly above the ground and can be attached to the supporting structure 132' using fasteners, such as bolts or the like, or other arrangements or methods. The swivel base 166 can include a fixed portion and a movable portion that is pivotally mounted to the fixed portion for angular displacement about a substantially vertical pivot axis 170 using a hinge assembly. For instance, the fixed portion can include a large rectangular anchoring plate 172 with a plurality of spaced-apart holes provided near its periphery to receive bolts or other kinds of fasteners, as shown. The movable portion can include a rigid structure having two spaced apart and parallel lateral vertical plates that are rigidly attached using top and bottom intermediary members. The swivel base 166 can be pivotally attached to or near the proximal end of the proximal arm 160 using a bottom hinge 174 located at or near the bottom of the movable portion. The bottom hinge 174 can pivot about a substantially horizontal pivot axis 176. Other configurations and arrangements are possible. Among other things, the various parts of the wheel chock handling unit 150 can be positioned and/or designed differently in other implementations, and one or more of these parts can also be omitted in others. Other variants are possible as well.

To facilitate the operation, the wheel chock handling unit 150 can include a main spring assembly 180 extending between the arm assembly 152 and the swivel base 166, as shown. In FIG. 11, the main spring assembly 180 includes an extension spring 182 and a linking member 184 extending between the upper end of the extension spring 182 and a second upper hinge 186 by which it is attached to or near the proximal end of the distal arm 162. This second upper hinge 186 can be above the first upper hinge 164, as shown. The main spring assembly 180 is generally configured and disposed to generate a pulling force sufficient to compensate a part of the weight of the wheel chock 100 and to overcome the friction of the wheel chock 100 on the ground, even at the maximum extended position, thereby allowing it to be brought back automatically towards the storage position when the wheel chock 100 is put on the ground, for instance next to where it was on the base plate 110. On the other hand, an excessive spring force can cause the wheel chock 100 to arrive too fast at its storage position, among other things. An excessive spring force can also make the wheel chock harder to move by hand and may tend to lift a portion of the wheel chock when set at some positions along the base plate 110. Other configurations and arrangements are possible. Among other things, the main spring assembly 180 can be designed differently, for instance be replaced by another kind of spring-loaded mechanism or force-generating feature, including one where there is no mechanical spring. Some implementations can be designed without the capacity of automatically bringing the wheel chock 100 back or towards a storage position. Other variants are possible as well.

Figure 12:
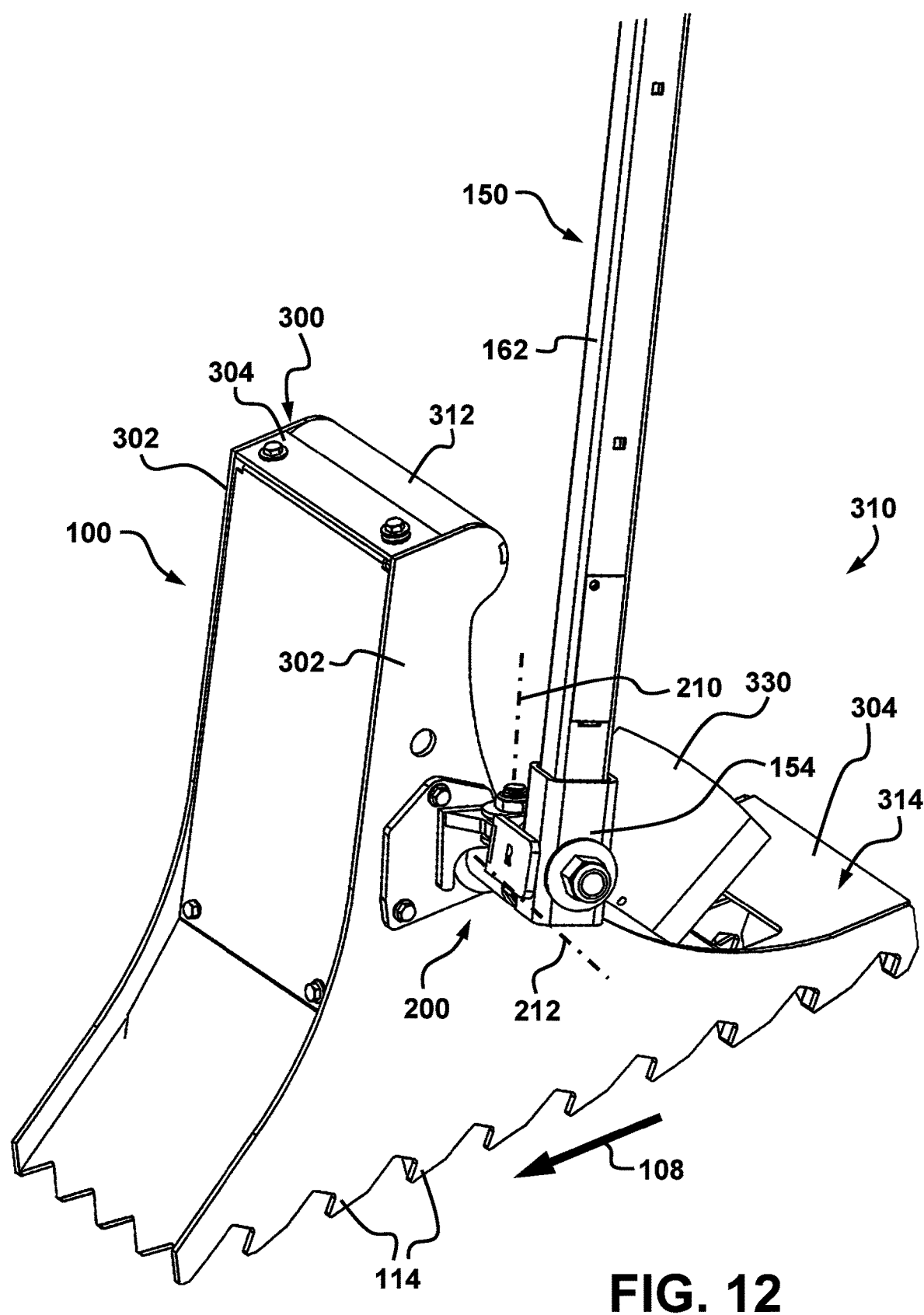
FIG. 12 is an enlarged isometric view of the wheel chock as well as other parts at or near the free end of the arm assembly shown in FIG. 11.
Figure 13:
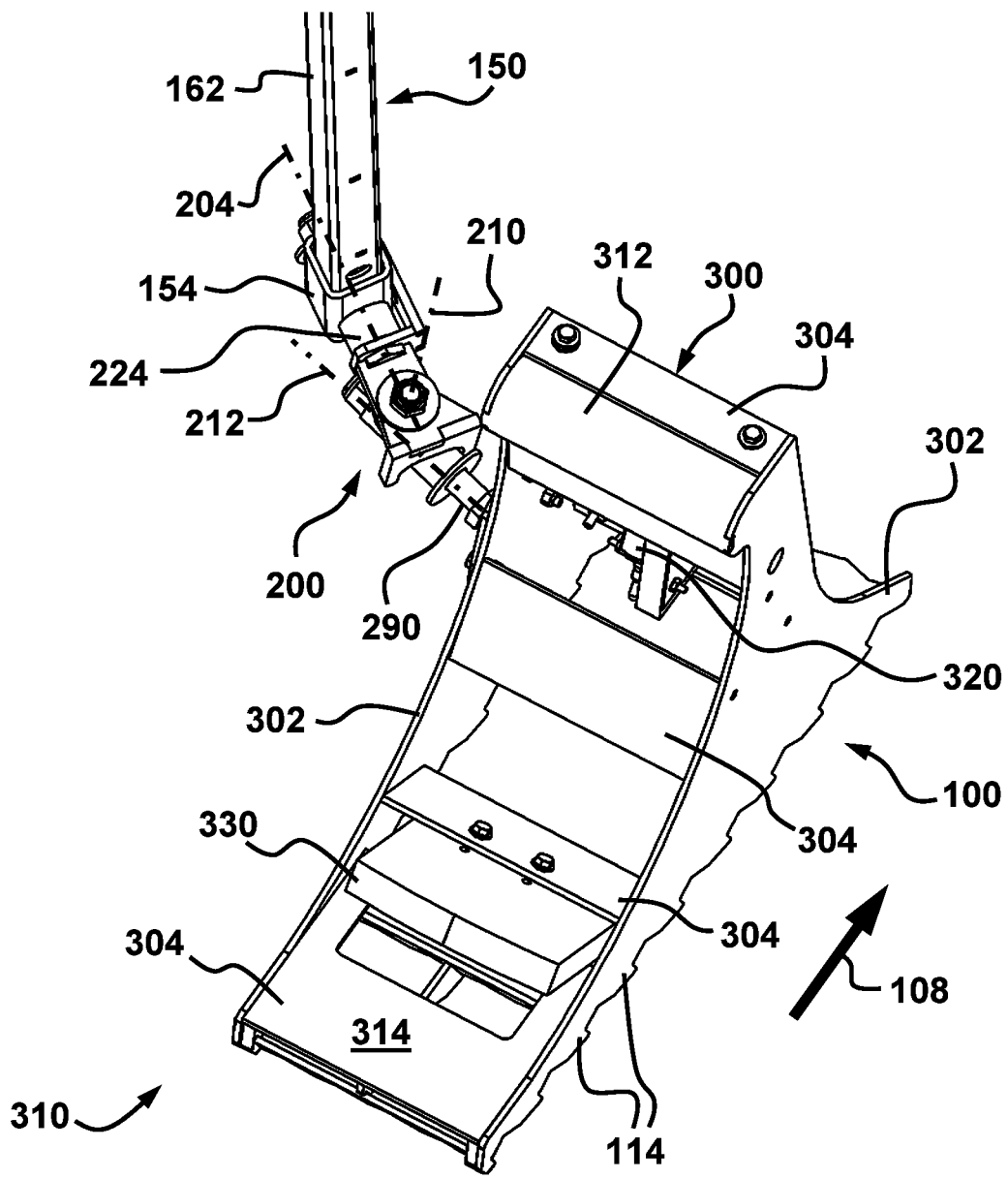
FIG. 13 is a view similar to FIG. 12 but taken from another viewpoint.

FIG. 12 is an enlarged isometric view of the wheel chock 100 as well as other parts at or near the free end 154 of the arm assembly 152 shown in FIG. 11. FIG. 13 is a view similar to FIG. 12 but taken from another viewpoint. FIGS. 12 and 13 show that the free end 154 of the arm assembly 152 can include a reinforcing sleeve affixed to the distal end of the distal arm 162. Other configurations and arrangements are possible. Among other things, the reinforcing sleeve can be designed and/or positioned differently, or even omitted, in some implementations. Other variants are possible as well.

The illustrated wheel chock 100 includes a main body 300. This main body 300 is the rigid supporting structure of the wheel chock 100. It is designed for resisting the forces applied on the wheel chock 100 by the wheel 102 of the vehicle 104 in the case of an unauthorized or accidental departure. The main body 300 can have a monolithic construction and at least a majority of its parts can be made of a strong rigid material, for instance steel or an alloy thereof. Other configurations and arrangements are possible. Among other things, using other materials is possible. In the present context, the expression "monolithic construction" means that there are no moving or easily detachable structural parts once the main body 300 is fully assembled. Hence, the main body 300 does not have a foldable arrangement when it has a monolithic construction. Advantages of having a monolithic construction include maximizing the simplicity of use, improving strength due to the absence of hinges or the like, particularly where the highest stresses can occur in use, and minimizing the manufacturing costs. Additional components can be added to the wheel chock 100, if desired and/or required, including some that are movable, for instance to selectively lock the wheel chock 100 onto the base plate 110. The main body 300 can have a construction that is not monolithic in some implementations. Other variants are possible as well.

The main body 300 of the wheel chock 100 can include two spaced-apart main side members 302, as shown. The side members 302 can be in the form of substantially vertically extending plates positioned substantially parallel to the longitudinal axis 108 when the wheel chock 100 is set in a working position over the base plate 110. The side members 302 can be rigidly connected together using, for instance, a plurality of transversal members 304 that are welded or otherwise rigidly attached to the side members 302 as shown. The wheel chock 100 can have a generally hollow interior. The teeth 114 on the underside of the wheel chock 100 can be machined along the bottom edge of each side member 302 and oriented to extend substantially parallel to the longitudinal axis 108. Each blocking element 112 with which the wheel chock 100 is engaged will generally be in a latched engagement simultaneously with at least two spaced-apart teeth 114 located at the same longitudinal position under the wheel chock 100, each of these teeth 114 projecting under a respective one of the side members 302. Other configurations and arrangements are possible in some implementations. Among other things, the wheel chock 100 can be designed differently, for instance without one or even both side members 302 and with the teeth 114 located elsewhere. The teeth 114 can also be positioned and/or shaped differently in some implementations. The transversal members 304 can be positioned and/or designed differently, or even be replaced by something else. Other variants are possible as well.

The illustrated wheel chock 100 includes a wheel-facing side 310. The wheel-facing side 310 is the side that is adjacent to a wheel to block, for example the wheel 102 (FIG. 10), when the wheel chock 100 is in position on the base plate 110. The wheel-facing side 310 of the wheel chock 100 can be greatly recessed so as to provide a tire deformation cavity located immediately below a wheel-engaging bulge 312, as shown. This wheel-engaging bulge 312 can be generally located at a top end of the wheel chock 100 to provide a main engagement surface on which a tire of the wheel 102 will exert most of its pressing force against the wheel chock 100 in the event of a premature or otherwise unexpected departure. The wheel-engaging bulge 312 can have a non-puncturing shape to prevent tire from being punctured or be otherwise damaged, for instance having a smooth and continuous rounded convex surface extending transversally, as shown. Also, one of the transversal members 304 can be positioned at the bottom of the wheel-facing side 310 and create a flat surface 314 that can receive a portion of the tire of the wheel 102 during an unauthorized or accidental departure to create a downward force holding the wheel chock 100 on the base plate 110. Other configurations and arrangements are possible. Among other things, the wheel-engaging bulge 312 can be positioned and/or designed differently, or even omitted, in some implementations. Some wheel chocks 100 can be designed without a tire deformation cavity. The surface 314 may also be positioned and/or designed differently, or even omitted. Other variants are possible as well.

The wheel chock 100 can include one or more sensors, such as a wheel sensor 320 located inside the main body 300 to detect the presence of the wheel or wheels 102, 102' next to the wheel chock 100 during operation, for instance the proximity of the tire thread of the wheel 102 on the wheel-facing side 310. Different kinds of wheel sensors 320 can be used, such as non-contact sensors (photocells) or the like. Using mechanical arrangements are possible as well. The wheel sensor or sensors 320 can be linked to one or more remote systems, for instance security and safety systems, using wired and/or wireless communication. These systems can use signals from the wheel sensor or sensors 320 to trigger different functions and/or to prevent other systems from operating unless the wheel chock 100 is properly placed next to a wheel or wheels 102, 102'. Triggered functions can include, for instance, issuing audible and/or visual alarm signals if a sensor does not indicate a proper positioning of the wheel chock 100 while someone attempts to initiate a task that must only be done if the wheel chock 100 is properly positioned. Signals from the wheel sensor or sensors 320 can also be sent to other active security and safety systems, such as interlocks, locking systems, barriers, etc. Some may require the use of identification (ID) cards and/or rely on biometric sensors, such as retina, fingerprints, or others. Other configurations and arrangements are possible. Among other things, the wheel sensor 320 can be positioned and/or designed differently, or even omitted, in some implementations. Other kinds of sensors can be provided on the wheel chocks 100. Other variants are possible as well.

An obliquely disposed resilient wheel spacer 330 can be provided on the wheel-facing side 310 of the wheel chock 100, as shown. This wheel spacer 330 can be made of rubber or the like. It can be useful for keeping the wheel chock 100 slightly away from the wheel 102 to mitigate the risks of having the wheel chock 100 becoming stuck under the tire of the wheel 102. This can occur for instance when the cargo compartment 140 of the vehicle 104 is empty when it arrives at the loading dock 130 and then receives a heavy load that significantly increase its weight. Other configurations and arrangements are possible. Among other things, the wheel spacer 330 can be positioned and/or designed differently, or even omitted, in some implementations. Other variants are possible as well.

The joint 200 can include a proximal section 202 having a main axis 204, and a distal section 206 affixed to the lateral side of the proximal section 202. The joint 200 is articulated around a first pivot axis 210 and, in the illustrated example, a second pivot axis 212. These axes will be referred to hereafter as the yaw axis 210 and the roll axis 212 for the sake of explanation. The yaw axis 210 has a generally vertical orientation and the roll axis 212 has a generally horizontal and transversal orientation in this example. Other configurations and arrangements are possible.

Figure 14:
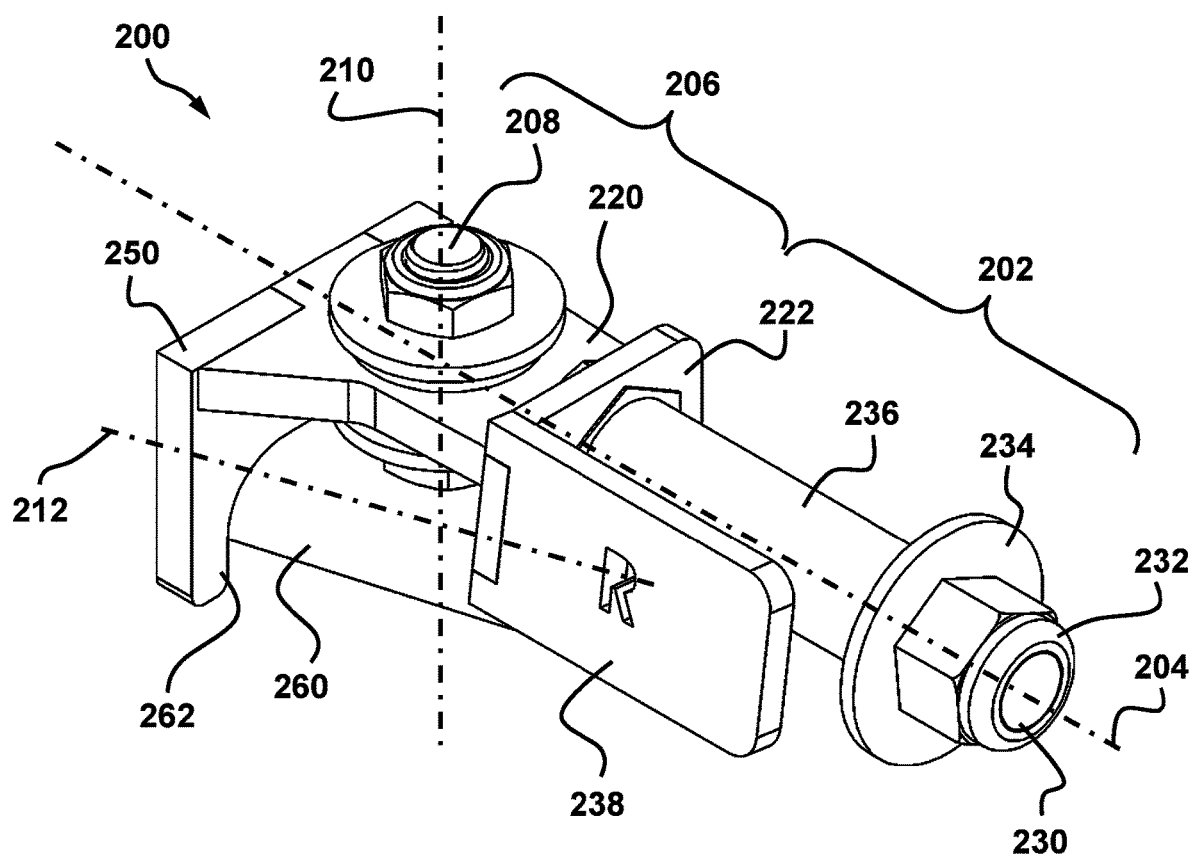
FIG. 14 is an isometric view of the universal joint interposed between the free end of the arm assembly and wheel chock shown in FIGS. 10 to 13.

FIG. 14 is an isometric view of the universal joint 200 interposed between the free end 154 of the arm assembly 152 and wheel chock 100 shown in FIGS. 10 to 13. This joint 200 includes a main plate 220 supporting the parts forming a first pivot coupling 208. The main plate 220 is a substantially flat piece that is orthogonal to the yaw axis 210 and that laterally projects from the side of a holding plate 222 provided to engage the end of a tubular spacer 224 (FIG. 13) provided between the holding plate 222 and the free end 154 of the arm assembly 152. The main plate 220 and the holding plate 222 are rigidly attached in the illustrated example, for instance by welding. This joint 200 also includes a mounting shaft 230 having one end extending from the holding plate 222 from a side opposite that of the main plate 220. The mounting shaft 230 is rigidly attached to the holding plate 222. The opposite end of the mounting shaft 230 has threads to receive a nut 232. A washer 234 is provided in this example, the joint 200 being attached by inserting the mounting shaft 230 into a transversal hole made across the free end 154 of the arm assembly 152. The nut 232 is then tightened until a rigid attachment is obtained. It should be noted that only the tip of the mounting shaft 230 is visible in FIG. 14 because of another tubular spacer 236 that is placed over the mounting shaft 230 to provide a tight fit of the parts inside the transversal hole of the free end 154 of the arm assembly 152. This example features a side plate 238 that is orthogonal to the holding plate 222 and rigidly attached along a common edge. The interior surface of the side plate 238 is designed to extend across the front surface of the free end 154. The side plate 238 sets the angle of the joint 200 for the initial installation and maintains the angle even if the nut 232 becomes loose for some reason. The letter R denotes that this joint 200 is to be used with a wheel chock handling unit 150 at the right side of the loading dock 130. Other configurations and arrangements are possible. Among other things, the joint 200 can be welded or otherwise attached to the free end 154 of the arm assembly 152 some other implementations. Other variants are possible as well.

The joint 200 includes a position limiter plate 250 extending downwards along the edge of the main plate 220, as shown. There is also an elongated link 260 having a free end positioned away from the lateral side of the proximal section 202. The link 260 can pass through an undercut made in a bottom portion 252 of the position limiter plate 250, as shown. This undercut can include a C-shaped bottom opening 262, as shown. The link 260 can include a rectilinear sleeve having a main axis corresponding to the roll axis 212, as shown. The undercut can have opposite first and second side edges, and the link 260 can be in abutment contact with the first side edge at a first angular end position and in abutment contact with the second side edge at a second angular end position. The position limiter plate 250 is one example of means for limiting axial pivot movements of the link 260 within a range of angular positions having a first angular end position and a second angular end position. Other configurations and arrangements are possible. Among other things, the link 260 can be designed and/or positioned differently, and the axial pivot movements of the link 260 can be limited using stoppers or other features provided on the main plate 220 or elsewhere. The undercut can be designed differently. Other variants are possible as well.

Figure 15:
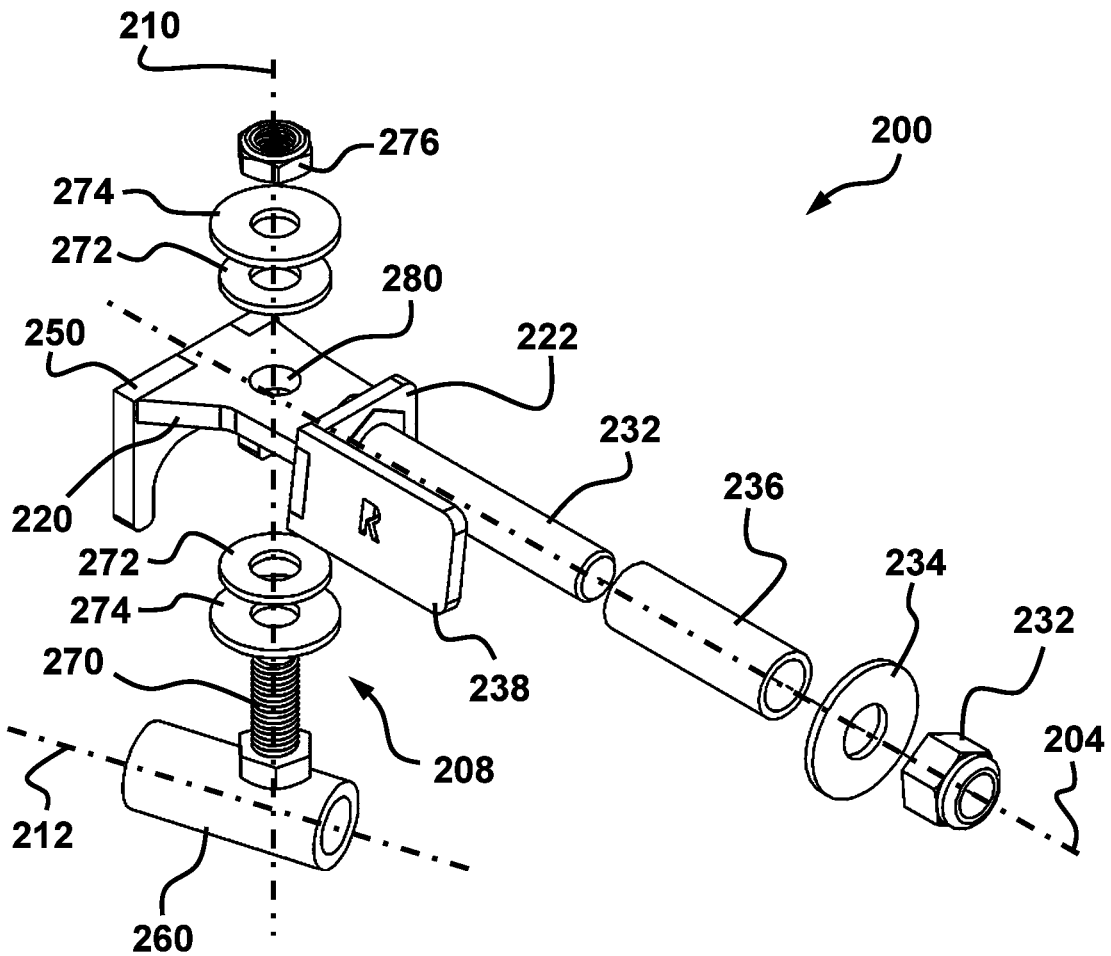
FIG. 15 is an exploded view of the parts shown in FIG. 14.

FIG. 15 is an exploded view of the parts shown in FIG. 14. As can be seen, the first pivot coupling 208 can include a shaft 270 having a bottom end rigidly attached over the link 260, for instance being connected to a nut welded onto the link 260. The link 260 can be part of a second pivot coupling. In this example, there are two bushings 272 and two washers 274. A nut 276 is mounted at the top end of the shaft 270 to hold the parts of this subassembly. The shaft 270 passes through the main plate 220 in a hole 280 and can include a threaded portion, as shown. Other configurations and arrangements are possible. It should be noted that the spacer 224 is not shown in FIGS. 14 and 15.

Figure 16:
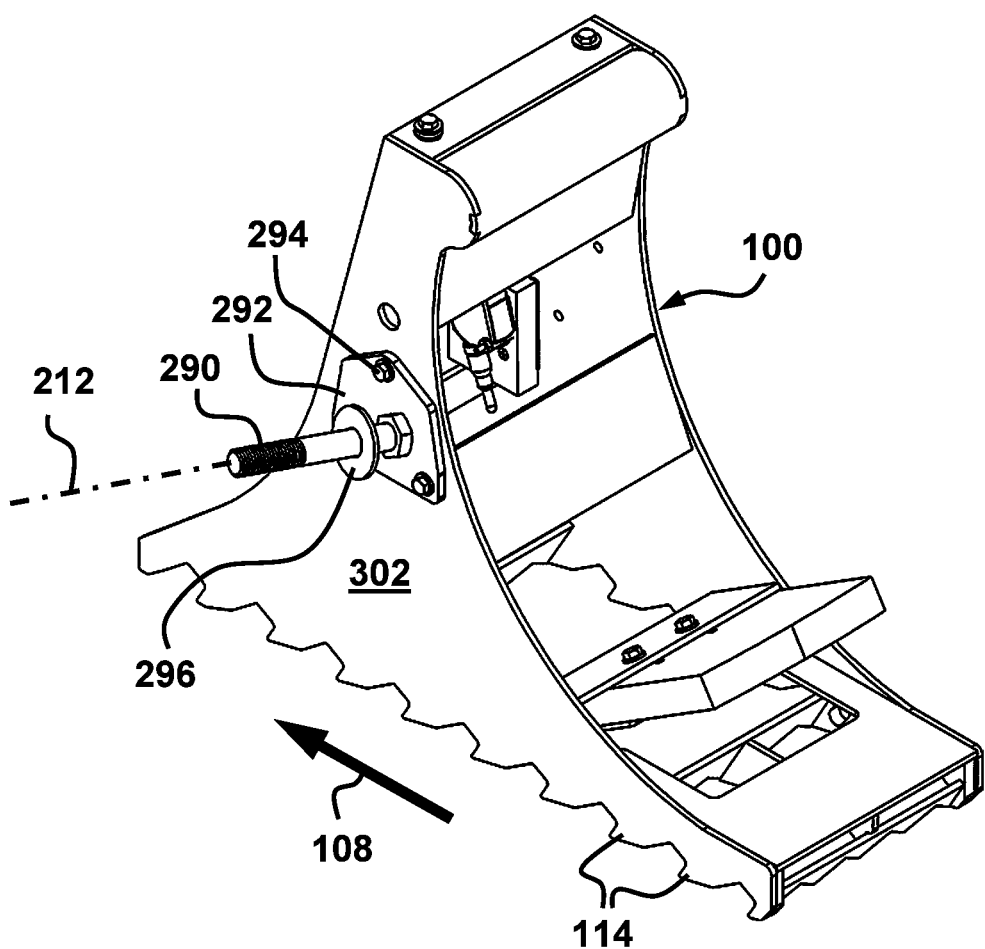
FIG. 16 is an isometric side view of the wheel chock with complementary parts for attaching it to the free end of the arm assembly shown in FIGS. 10 to 13.

FIG. 16 is an isometric side view of the wheel chock 100 with complementary parts for attaching it to the free end 154 of the arm assembly 152 shown in FIGS. 10 to 13. FIG. 16 shows, among other things, the position of the roll axis 212 when the wheel chock 100 is connected to the joint 200. The roll axis 212 is coincident with a support shaft 290 having one end rigidly attached to a bracket plate 292 using bolts 294 or the like. The bracket plate 292 in this example is rigidly attached to the outer lateral surface of the side member 302 of the wheel chock 100. A washer 296 is mounted onto the support shaft 290. The free end of the support shaft 290 is configured and disposed to be inserted through the link 260. A nut 298 (FIG. 22) holds the support shaft 290 into the link 260. The wheel chock 100 can freely pivot about the roll axis 212. The wheel chock 100 is configured and disposed so that it is balanced and self-leveling about the roll axis 212, allowing its bottom side to remain relatively at the horizontal. Other configurations and arrangements are possible.

Figure 17:
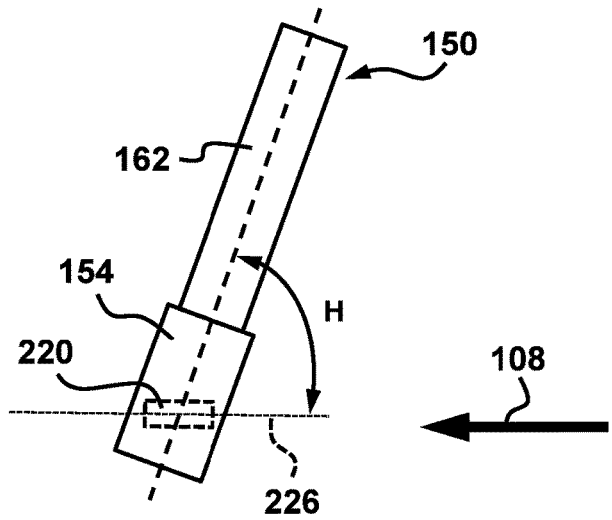
FIG. 17 is a semi-schematic side view depicting the free end of the arm assembly and the main plate of the joint at position B shown as an example in FIG. 5.

FIG. 17 is a semi-schematic side view depicting the free end 154 of the arm assembly 152 and the main plate 220 of the joint 200 at position B shown as an example in FIG. 5. The other parts of the joint 200 are not shown for the sake of simplicity. The view is taken from a viewpoint of someone standing next to the free end 154 of the arm assembly 152 and looking towards the base plate 110. The main plate 220 is thus located on the opposite side of the free end 154. The dashed line passing across the width of the main plate 220 is indicative of the static orientation of its plane with reference to the main axis of the distal arm 164. As can be seen, the main plate 220 is substantially horizontal while the distal arm 164 is not. The angle H between them is thus non-orthogonal and acute in this example. Other configurations and arrangements are possible.

Figure 18:
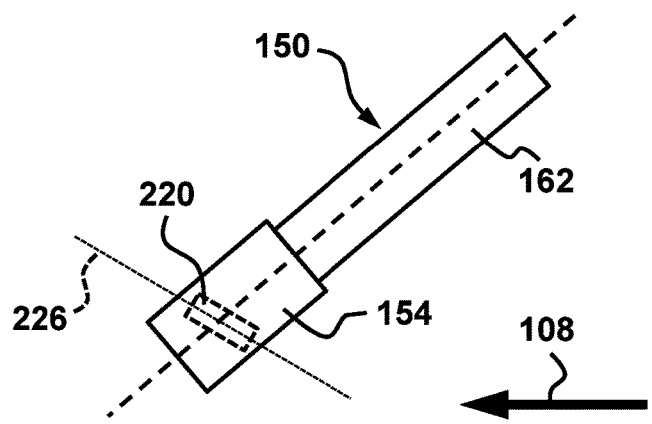
FIG. 18 is a view similar to FIG. 17 but where the parts are at position C shown as an example in FIG. 5.

FIG. 18 is a view similar to FIG. 17 but where the parts are at position C shown as an example in FIG. 5. As can be seen, the main plate 220 is now tilted downwards in that position, for instance of about 15 degrees.

Figure 19:
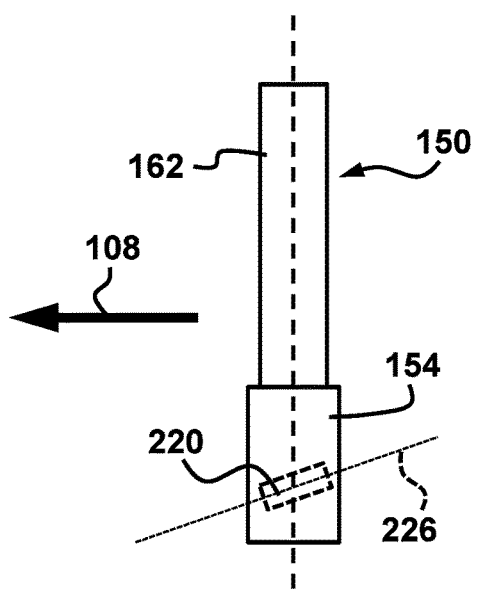
FIG. 19 is also a view similar to FIG. 17 but where the parts are at position S shown as an example in FIG. 5.

FIG. 19 is also a view similar to FIG. 17 but where the parts are at position S shown as an example in FIG. 5. As can be seen, the distal arm 164 is now almost vertical, and the main plate 220 is now oriented at an oblique angle that is in the opposite direction compared to that of the example shown in FIG. 18.

Figure 20:
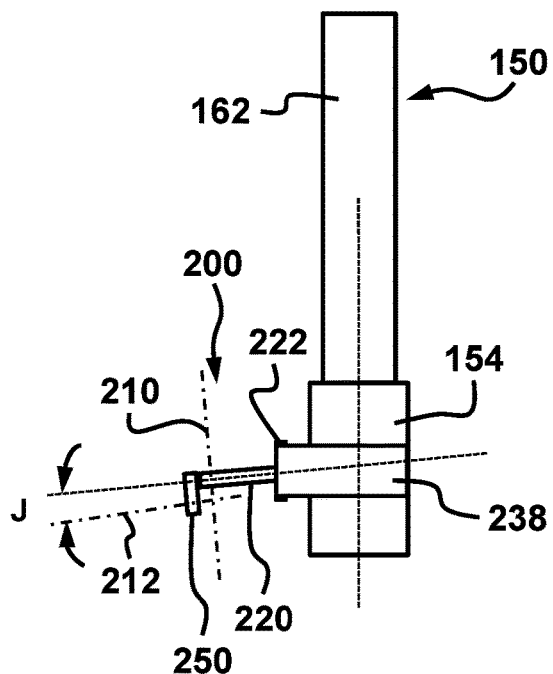
FIG. 20 is a semi-schematic front view of the free end of the arm assembly and of the joint shown in FIG. 14.

FIG. 20 is a semi-schematic front view of the free end 154 of the arm assembly 152 and of the joint 200 shown in FIG. 14. It shows that the main plate 220 can be slightly tilted downwards to promote the repositioning effect. The roll axis 212 also defines an angle J with reference to the main plate 220. The angles are exaggerated for the sake of illustration. Other configurations and arrangements are possible. Among other things, this tilting can be omitted in some implementations. Some implementations may obtain this second inclination of the yaw axis 210 simply because the weight of the wheel chock 100 being supported at the side of the arm assembly 152. Other configurations and arrangements are possible.

Figure 21:
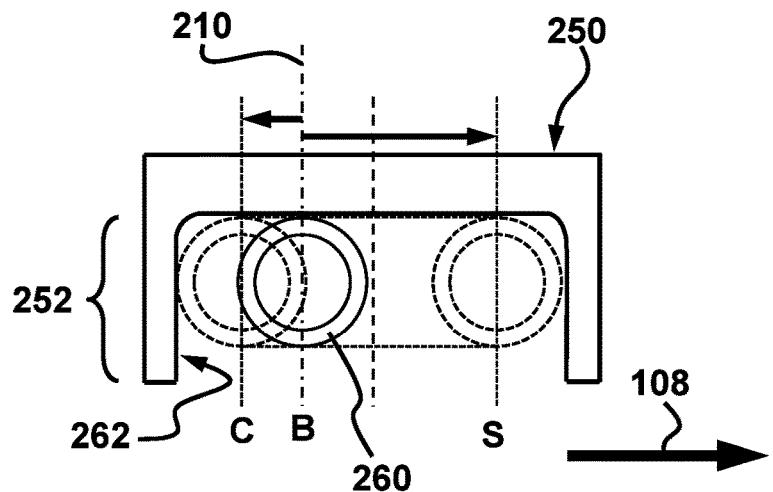
FIG. 21 is an enlarged schematic side view of the position limiter plate of the joint shown in FIG. 14.

FIG. 21 is an enlarged schematic side view of the position limiter plate 250 of the joint 200 shown in FIG. 14. The cross section of the link 260 taken from inside the position limiter plate 250 is schematically depicted at different positions for the sake of explanation. As can be seen, the geometric center of the C-shaped bottom opening 262 of the position limiter plate 250 is offset with reference to the position of the yaw axis 210 in this example. The range of angles at the right in FIG. 21 is wider than that at the left, as shown by the arrows. This is because the first half of the range (i.e., the ones closer to the wall 132) requires more compensation than what is needed for the second half. Positions B, C and S are depicted for the sake of illustration. In use, the weight of the wheel chock 100 will force the link 260 to pivot towards the appropriate side based on the inclination of the joint 200, as shown. The position limiter plate 250 is rigidly attached to the main plate 220 and it follows the inclination shown for instance in FIGS. 17, 18 and 19.

Figure 22:
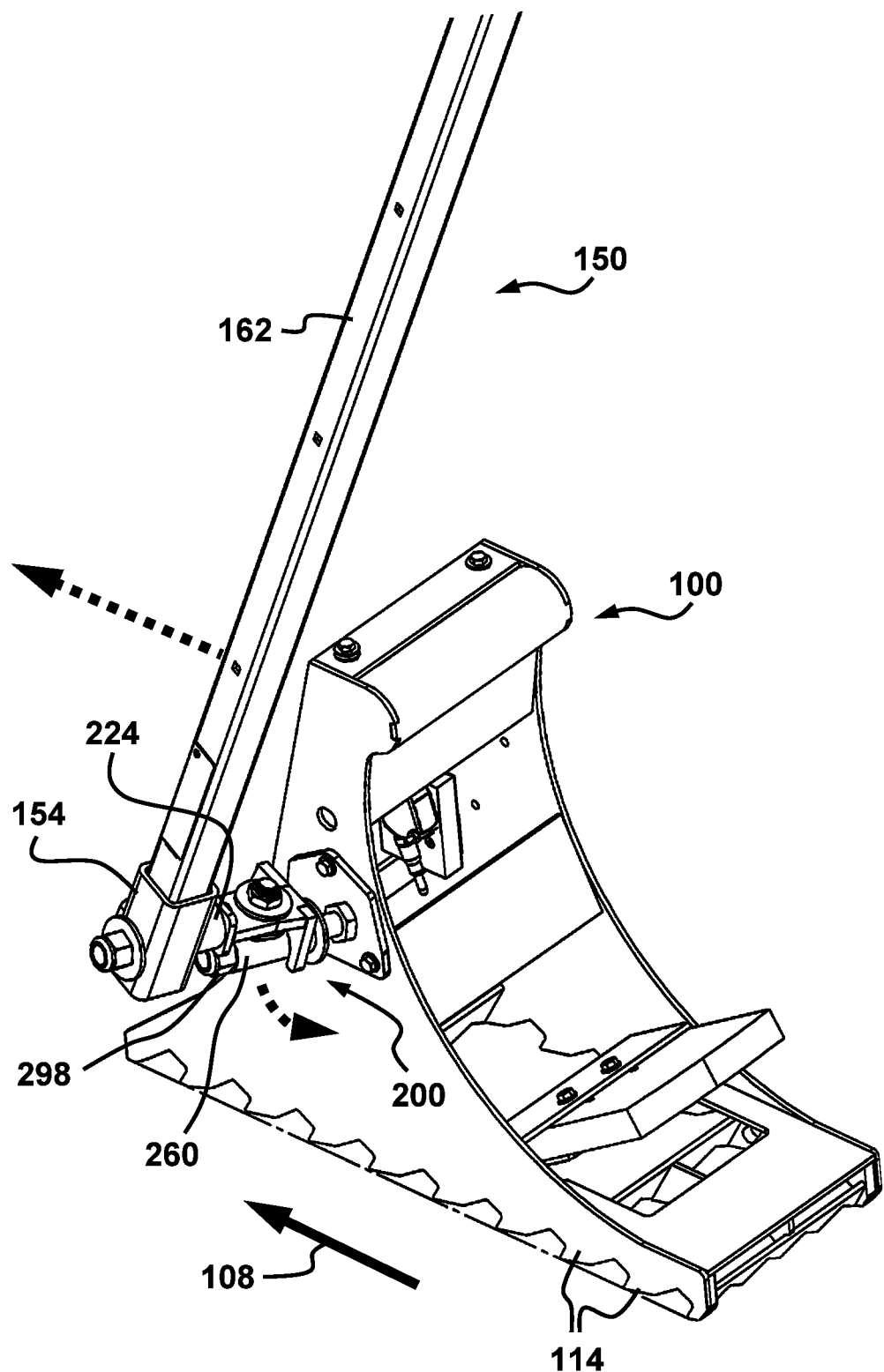
FIG. 22 is an enlarged isometric view similar to FIG. 12 but illustrating an example where the wheel chock is being moved towards a new position further away from the wall.

FIG. 22 is an enlarged isometric view similar to FIG. 12 but illustrating an example where the wheel chock 100 is being moved towards a new position further away from the wall 132.

Figure 23:
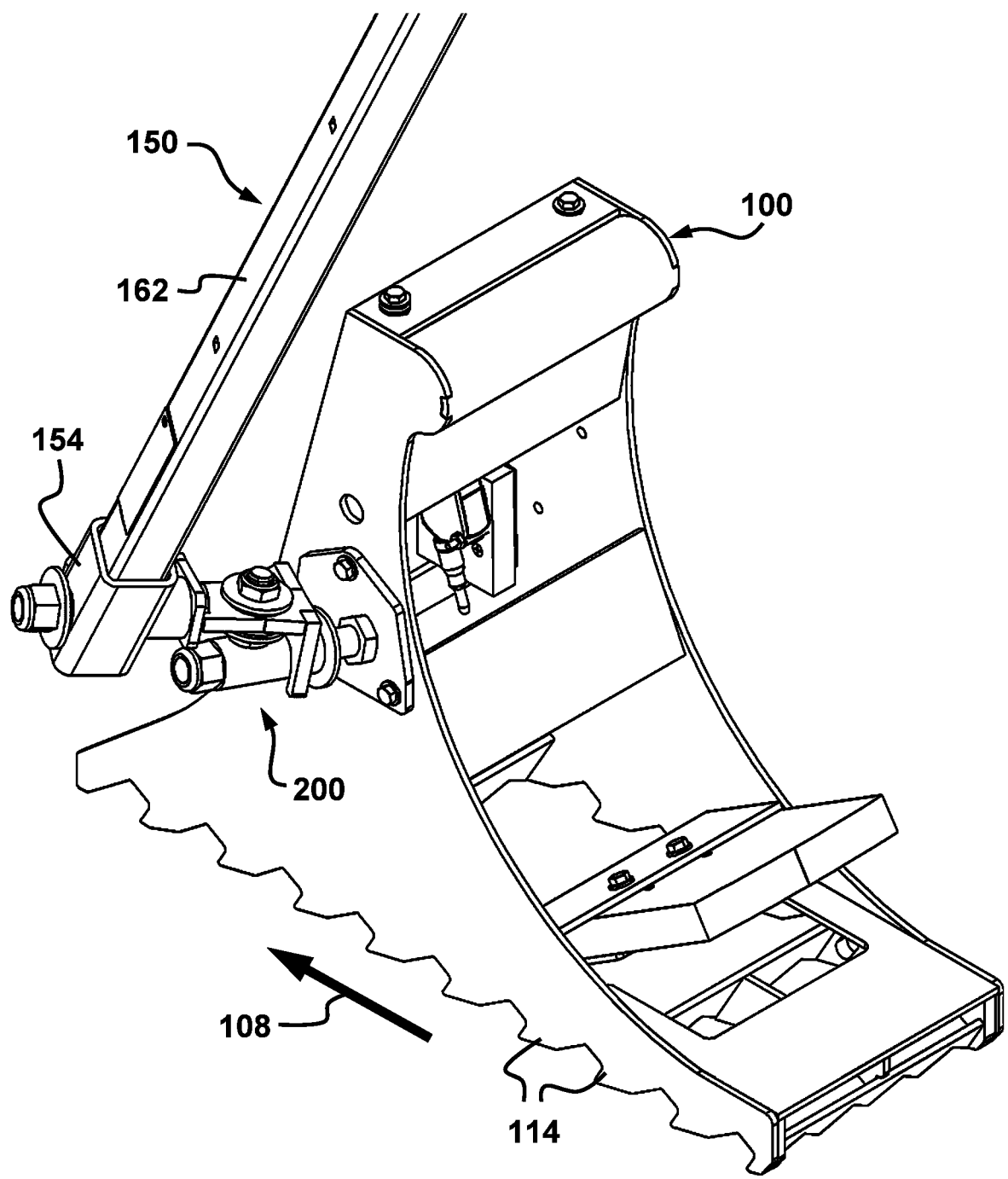
FIG. 23 is a view similar to FIG. 22 but where the wheel chock is now just above the new position and after it was automatically realigned by the joint.

FIG. 23 is a view similar to FIG. 22 but where the wheel chock 100 is now just above the new position and after it was automatically realigned by the joint 200.

Overall, implementing the proposed concept results in wheel chock handling unit 150 that are more versatile, easier to use and that can perform much better over a wider range of operation than ever before.

The present detailed description and the appended figures are meant to be exemplary only, and a skilled person will recognize that many changes can be made while still remaining within the proposed concept. Among other things, and unless otherwise explicitly specified, none of the parts, elements, characteristics or features, or any combination thereof, should be interpreted as being necessarily essential to the invention simply because of their presence in one or more examples described, shown and/or suggested herein.

| REFERENCE NUMERALS | |
|---|---|
| 100 | wheel chock |
| 102 | wheel |
| 102' | adjacent wheel |
| 104 | vehicle |
| 108 | longitudinal axis |
| 110 | base plate |
| 110' | base plate section |
| 112 | blocking element |
| 114 | tooth/teeth |
| 116 | peripheral rim |
| 120 | wheel chock restraint system |
| 130 | loading dock |
| 132 | wall |
| 132' | reference plane/structure |
| 134 | cushion |
| 140 | cargo compartment |
| 142 | garage door |
| 144 | floor |

-continued

| REFERENCE NUMERALS | |
|---|---|
| 146 | floor |
| 150 | wheel chock handling unit |
| 152 | articulated cantilever arm assembly |
| 154 | free end (of the arm assembly) |
| 156 | holding member (prior art) |
| 160 | proximal arm |
| 162 | distal arm |
| 164 | first upper hinge |
| 166 | swivel base |
| 170 | vertical pivot axis |
| 172 | anchoring plate |
| 174 | bottom hinge |
| 176 | horizontal pivot axis |
| 180 | main spring assembly |
| 182 | extension spring |
| 184 | linking member |
| 186 | second upper hinge |
| 200 | universal joint |
| 202 | proximal section |
| 204 | main axis (of proximal section) |
| 206 | distal section |
| 208 | first pivot coupling |
| 210 | yaw axis |
| 212 | roll axis |
| 220 | main plate |
| 222 | holding plate |
| 224 | spacer |
| 226 | plane (of main plate) |
| 230 | mounting shaft |
| 232 | nut |
| 234 | washer |
| 236 | tubular spacer |
| 238 | side plate |
| 250 | position limiter plate |
| 252 | bottom portion (of plate 250) |
| 260 | link |
| 262 | C-shaped undercut |
| 270 | shaft |
| 272 | bushings |
| 274 | washers |
| 276 | nut |
| 280 | hole |
| 290 | support shaft |
| 292 | bracket plate |
| 294 | bolt |
| 296 | washer |
| 298 | nut |
| 300 | main body (of wheel chock) |
| 302 | side member |
| 304 | transversal member |
| 310 | wheel-facing side |
| 312 | wheel-engaging bulge |
| 314 | surface |
| 320 | wheel sensor |
| 330 | wheel spacer |

The invention claimed is:

1. A universal joint (200) for securing a wheel chock (100) at a free end (154) of an arm assembly (152) in a wheel chock handling unit (150), the joint (200) including:

a proximal section (202) having a main axis (204) and a lateral side;

a distal section (206) affixed to the lateral side of the proximal section (202), the distal section (206) including:

a main plate (220) defining a first plane (226) projecting from the lateral side of the proximal section (202);

a first pivot coupling (208) provided on the main plate (220) and defining a yaw axis (210);

an elongated link (260) attached to the first pivot coupling (208) and being pivotable about the yaw axis (210) with reference to the main plate (220), the link (260) having a main axis (212) and having a free end positioned away from the lateral side of the proximal section (202); and means for limiting axial pivot movements of the link (260) within a range of angular positions having a first angular end position and a second angular end position.

2. The joint (200) as defined in claim 1, wherein the first pivot coupling (208) includes a bottom portion extending under the main plate (220), the link (260) being rigidly attached to the bottom portion of the first pivot coupling (208).

3. The joint (200) as defined in claim 2, wherein the bottom portion of the first pivot coupling (208) is part of a shaft (270), the shaft (270) further including an upper portion passing through a hole (280) made across the main plate (220).

4. The joint (200) as defined in claim 2, wherein the link (260) is rigidly attached at an extremity of the bottom portion of the first pivot coupling (208).

5. The joint (200) as defined in claim 1, wherein the main axis (212) of the link (260) defines an obtuse angle with reference to the yaw axis (210).

6. The joint (200) as defined in claim 1, wherein the range of angular positions of the link (260) is asymmetric with reference to a central angular position, the first angular end position defining an angle with reference to the central angular position that is smaller than that of the second angular end position with reference to the central angular position.

7. The joint (200) as defined in claim 1, wherein the means for limiting axial pivot movements of the link (260) includes a position limiter plate (250) provided on the main plate (220) and having a bottom portion (252) extending underneath the main plate (220), the bottom portion (252) of the position limiter plate (250) having an undercut through which extends the link (260), the bottom portion (252) of the position limiter plate (250) having opposite first and second side edges inside the undercut, the link (260) being in abutment contact with the first side edge at the first angular end position and being in abutment contact with the second side edge at the second angular end position.

8. The joint (200) as defined in claim 7, wherein the position limiter plate (250) is positioned at a distal edge of the main plate (220).

9. The joint (200) as defined in claim 7, wherein the undercut is a substantially C-shaped opening (262) made across the bottom portion (252) of the position limiter plate (250).

10. The joint (200) as defined in claim 1, wherein the link (260) is part of a second pivot coupling defining a roll axis.

11. The joint (200) as defined in claim 10, wherein the link (260) includes a sleeve, and the main axis (212) of the link (260) is coincident with the roll axis.

12. The joint (200) as defined in claim 11, wherein the second pivot coupling includes a support shaft (290) having a proximal section and a distal section, the proximal section of the support shaft (290) being pivotally mounted inside the link (260).

13. The joint (200) as defined in claim 12, further including a means for attaching the proximal section of the support shaft (290) to the wheel chock (100).

14. The joint (200) as defined in claim 13, wherein the means for attaching includes a bracket plate (292) to which a free end of the proximal section of the support shaft (290) is rigidly attached.

15. A wheel chock restraint system (120) including:

a wheel chock (100);

an elongated base plate (110) extending along a longitudinal axis (108), the base plate (110) having a plurality of blocking elements (112) transversally disposed on the base plate (110) and that are spaced apart from one another along the longitudinal axis (108), the blocking elements (112) being configured and disposed to cooperate with corresponding teeth (114) provided underneath the wheel chock (100);

a wheel chock handling unit (150) having a spring-assisted articulated cantilever arm assembly (152) pivotally mounted to a base for angular displacement of the arm assembly (152) in a substantially vertical plane between a storage position and a plurality of extended positions, the arm assembly (152) having a free end (154);

a universal joint (200) affixed to the free end (154) of the arm assembly (152), the universal joint (200) including:

a main plate (220) defining a first plane (226) projecting from a lateral side of the arm assembly (152);

a first pivot coupling (208) provided on the main plate (220) and defining a yaw axis (210);

an elongated link (260) attached to the first pivot coupling (208) and being pivotable about the yaw axis (210) with reference to the main plate (220), the link (260) having a main axis (212) and having a free end positioned away from the lateral side of the arm assembly (152); and means for limiting axial pivot movements of the link (260) within a range of angular positions having a first angular end position and a second angular end position.

16. The wheel chock restraint system (120) as defined in claim 15, wherein the first pivot coupling (208) includes a bottom portion extending under the main plate (220), the link (260) being rigidly attached to the bottom portion of the first pivot coupling (208).

17. The wheel chock restraint system (120) as defined in claim 16, wherein the bottom portion of the first pivot coupling (208) is part of a shaft (270), the shaft (270) further including an upper portion passing through a hole (280) made across the main plate (220).

18. The wheel chock restraint system (120) as defined in claim 16, wherein the link (260) is rigidly attached at an extremity of the bottom portion of the first pivot coupling (208).

19. The wheel chock restraint system (120) as defined in claim 15, wherein the main axis (212) of the link (260) defines an obtuse angle with reference to the yaw axis (210).

20. The wheel chock restraint system (120) as defined in claim 15, wherein the range of angular positions of the link (260) is asymmetric with reference to a central angular position, the first angular end position defining an angle with reference to the central angular position that is smaller than that of the second angular end position with reference to the central angular position.

21. The wheel chock restraint system (120) as defined in claim 15, wherein the means for limiting axial pivot movements of the link (260) includes a position limiter plate (250) provided on the main plate (220) and having a bottom portion (252) extending underneath the main plate (220), the bottom portion (252) of the position limiter plate (250) having an undercut through which extends the link (260), the bottom portion (252) of the position limiter plate (250) having opposite first and second side edges inside the undercut, the link (260) being in abutment contact with the first side edge at the first angular end position and being in abutment contact with the second side edge at the second angular end position.

22. The wheel chock restraint system (120) as defined in claim 21, wherein the position limiter plate (250) is positioned at a distal edge of the main plate (220).

23. The wheel chock restraint system (120) as defined in claim 21, wherein the undercut is a substantially C-shaped opening (262) made across the bottom portion (252) of the position limiter plate (250).

24. The wheel chock restraint system (120) as defined in claim 15, wherein the link (260) is part of a second pivot coupling defining a roll axis.

25. The wheel chock restraint system (120) as defined in claim 24, wherein the link (260) includes a sleeve, and the main axis (212) of the link (260) is coincident with the roll axis.

26. The wheel chock restraint system (120) as defined in claim 25, wherein the second pivot coupling includes a support shaft (290) having a proximal section and a distal section, the proximal section of the support shaft (290) being pivotally mounted inside the link (260).

27. The wheel chock restraint system (120) as defined in claim 26, further including a means for attaching the proximal section of the support shaft (290) to the wheel chock (100).

28. The wheel chock restraint system (120) as defined in claim 27, wherein the means for attaching includes a bracket plate (292) to which a free end of the proximal section of the support shaft (290) is rigidly attached.

* * * * *